US 8,142,557 B2

(12) United States Patent
Belelie et al.

(10) Patent No.: US 8,142,557 B2
(45) Date of Patent: *Mar. 27, 2012

(54) RADIATION CURABLE INK CONTAINING GELLANT AND RADIATION CURABLE WAX

(75) Inventors: Jennifer L. Belelie, Oakville (CA); Peter G. Odell, Mississauga (CA); Eniko Toma, Mississauga (CA); Christopher A. Wagner, Toronto (CA); C. Geoffrey Allen, Waterdown (CA); Stephan V. Drappel, Toronto (CA)

(73) Assignee: Xerox Corporation, Norwalk, CT (US)

( * ) Notice: Subject to any disclaimer, the term of this patent is extended or adjusted under 35 U.S.C. 154(b) by 1113 days.

This patent is subject to a terminal disclaimer.

(21) Appl. No.: 11/427,172

(22) Filed: Jun. 28, 2006

(65) Prior Publication Data

US 2008/0000384 A1    Jan. 3, 2008

(51) Int. Cl.
*C09D 11/00* (2006.01)
*B01F 3/04* (2006.01)

(52) U.S. Cl. ......... 106/31.13; 522/173; 522/40; 522/42; 522/43; 522/64

(58) Field of Classification Search .............. 106/31
See application file for complete search history.

(56) References Cited

U.S. PATENT DOCUMENTS

| | | | |
|---|---|---|---|
| 3,653,932 A | 4/1972 | Berry et al. | |
| 3,782,896 A * | 1/1974 | Defago et al. | 8/470 |
| 4,390,369 A | 6/1983 | Merritt et al. | |
| 4,484,948 A | 11/1984 | Merritt et al. | |
| 4,684,956 A | 8/1987 | Ball | |
| 4,851,045 A | 7/1989 | Taniguchi | |
| 4,889,560 A | 12/1989 | Jaeger et al. | |
| 5,006,170 A * | 4/1991 | Schwarz et al. | 106/31.3 |
| 5,151,120 A | 9/1992 | You et al. | |
| 5,372,852 A | 12/1994 | Titterington et al. | |
| 5,496,879 A | 3/1996 | Griebel et al. | |
| 5,804,671 A | 9/1998 | Dones et al. | |
| 5,889,076 A | 3/1999 | Dones et al. | |
| 6,114,406 A * | 9/2000 | Caiger et al. | 522/121 |
| 6,239,189 B1 | 5/2001 | Narayan et al. | |
| 6,316,517 B1 | 11/2001 | Dones et al. | |
| 6,467,897 B1 | 10/2002 | Wu et al. | |
| 6,586,492 B1 | 7/2003 | Caiger et al. | |
| 6,896,937 B2 | 5/2005 | Woudenberg | |
| 7,625,956 B2 * | 12/2009 | Odell et al. | 522/173 |
| 2003/0036587 A1 | 2/2003 | Kozak | |
| 2003/0128264 A1 * | 7/2003 | Ishikawa et al. | 347/102 |
| 2007/0120910 A1 * | 5/2007 | Odell et al. | 347/88 |
| 2007/0120921 A1 * | 5/2007 | Carlini et al. | 347/100 |
| 2007/0123606 A1 * | 5/2007 | Toma et al. | 523/160 |
| 2007/0123723 A1 * | 5/2007 | Odell et al. | 554/36 |

FOREIGN PATENT DOCUMENTS

WO    WO/97/31071    *    8/1997

* cited by examiner

*Primary Examiner* — Melvin Mayes
*Assistant Examiner* — Yun Qian
(74) *Attorney, Agent, or Firm* — Oliff & Berridge, PLC

(57) ABSTRACT

Radiation curable phase change ink comprising an ink vehicle that includes at least one curable carrier, at least one gellant, at least one curable wax and at least one photoinitiator. In a method of forming an image with the ink, the radiation curable phase change ink is melted, then jetted onto an image receiving substrate, wherein the radiation curable phase change ink forms a gel state, and exposed to ultraviolet light to cure the curable components of the radiation curable phase change ink. The wax cures into the structure of the ink, thereby generating a robust image of excellent gloss.

18 Claims, 3 Drawing Sheets

RADIATION CURABLE INK CONTAINING GELLANT AND RADIATION CURABLE WAX

TECHNICAL FIELD

The present disclosure generally relates to curable inks, particularly curable phase change inks, and their use in methods for forming images, particularly their use in ink jet printing.

The inks herein are advantageous in stability, while being able to achieve images of high quality and greatly reduced showthrough.

BACKGROUND

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand.

In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In ink jetting, it is known to use phase change inks, also referred to as hot-melt inks. In general, phase change inks are in the solid phase at, for example, ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have been used in other printing technologies, such as gravure printing, as disclosed in, for example, U.S. Pat. No. 5,496,879, the disclosure of which is totally incorporated herein by reference. Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

REFERENCES

References disclosing phase change inks include U.S. Pat. Nos. 3,653,932, 4,390,369, 4,484,948, 4,684,956, 4,851,045, 4,889,560, 5,006,170, 5,151,120, 5,372,852 and 5,496,879, the disclosures of each of which are totally incorporated herein by reference. Suitable carrier materials for the inks can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 5,804,671 discloses a composition that is useful in the preparation of radiation curable coatings. The composition comprises the reaction product of an epoxy component comprising a diepoxide and an acid component comprising an ethylenically unsaturated carboxylic acid or reactive derivative thereof, reacted in the presence of a polyamide based on a polymerized fatty acid.

U.S. Pat. No. 5,889,076 discloses a composition that is useful in the preparation of radiation curable coatings. The composition comprises the reaction product of an epoxy component and an acid component comprising an ethylenically unsaturated carboxylic acid or reactive derivative thereof, reacted in the presence of, or post-reaction blended with, a polyamide based on a polymerized fatty acid.

U.S. Pat. No. 6,239,189 discloses a radiation-polymerizable composition containing at least one radiation curable acrylate resin oligomer prepared by reacting an alkoxylated polyol with a first acid component which includes an ethylenically unsaturated carboxylic acid, and a rheology modifier prepared by reacting a diepoxide with a second acid component which includes an ethylenically unsaturated carboxylic acid or reactive derivative thereof in the presence of a polyamide based on a polymerized fatty acid.

U.S. Pat. No. 6,316,517 discloses radiation-polyinerizable compositions especially useful as or in a flush vehicle for making flushed pigments. The compositions contain at least one radiation-curable acrylated resin component and a copolymerizable rheology modifier component.

U.S. Patent Publication No. 2003/0036587 discloses rheology-controlled epoxy-based compositions particularly well suited for use in coating applications such as in the assembly of ink jet printheads for the printing industry, and in the microelectronics industry such as in the assembly of semiconductor devices.

U.S. Pat. No. 6,586,492 discloses an ink-jet ink including an ink jet vehicle and a colorant. The vehicle includes at least 35 percent by weight radiation curable material based on the total vehicle weight. The vehicle may but does not necessarily include a thickener. The vehicle is a paste or a solid at 20° C. and has a viscosity of less than 25 centipoise between 40° C. and 130° C.

U.S. Pat. No. 6,467,897 discloses the method of forming an ink jetted feature including providing a composition that includes a plurality of nanometer-sized, surface modified, inorganic oxide particles dispersed in an energy curable fluid vehicle, ink jetting the composition onto a substrate to form a printed feature, and exposing the printed feature to an amount of curing energy under conditions effective to at least partially cure the energy curable fluid.

U.S. Pat. No. 6,896,937 discloses radiation-curable ink compositions and methods of printing including the compositions. In some embodiments, a radiation-curable hot melt ink composition includes a colorant, a polymerizable monomer, and a photoinitiating system. The photoinitiating system can include 0.5 to 1.5 percent by weight of an aromatic ketone photoinitiator, 2 to 10 percent by weight of an amine synergist, 3 to 8 percent by weight of an alpha-cleavage type photoinitiator, and 0.5 to 1.5 percent by weight of a photosensitizer.

Recently, Xerox has discovered several UV curable gellant inks. These UV curable gellant inks bring new potential to direct marking technology. The gellant driven phase change preserves drop integrity in direct to paper applications and is particularly suited to coated papers and high quality uncoated papers. The UV cure provides a robust glossy image. The current ink designs have been demonstrated to be stable at jetting temperatures (75-85° C.) for weeks and to remain functional after several freeze-thaw cycles. Although suitable on coated or glossy papers, the inks demonstrate higher than ideal levels of showthrough on plain papers, which is an undesirable characteristic of the current ink design. The observed showthrough is the result of many factors, one which of is believed to be component separation after the ink drops hit the paper.

While known compositions and processes are suitable for their intended purposes, a need remains for improved phase change inks, for example for radiation curable phase change inks that exhibit decreased levels of component separation in a printed image, for radiation curable phase change inks that exhibit a decreased amount of showthrough in printed images, and for radiation curable phase change inks with improved stability.

SUMMARY

These and other improvements are accomplished by the radiation curable phase change inks described herein.

In embodiments, the radiation curable phase change ink is comprised of an ink vehicle that includes at least one curable carrier, at least one gellant, at least one radiation curable wax and at least one photoinitiator.

In embodiments, the radiation curable phase change ink is comprised of an ink vehicle that includes at least one radiation curable carrier present in an amount from about 0.1% to about 98% by weight of the ink, at least one gellant present in an amount from about 1% to about 25% by weight of the ink, at least one radiation curable wax present in an amount from about 0.1% to about 50% by weight of the ink and at least one photoinitiator present in an amount from about 0.5% to about 15% by weight of the ink.

In embodiments of forming an image with the ink, the radiation curable phase change ink is melted, jetted onto an image receiving substrate, wherein the radiation curable phase change ink forms a gel state, and exposed to ultraviolet light to cure the curable components of the radiation curable phase change ink.

DETAILED DESCRIPTION OF EMBODIMENTS

Figure 1:
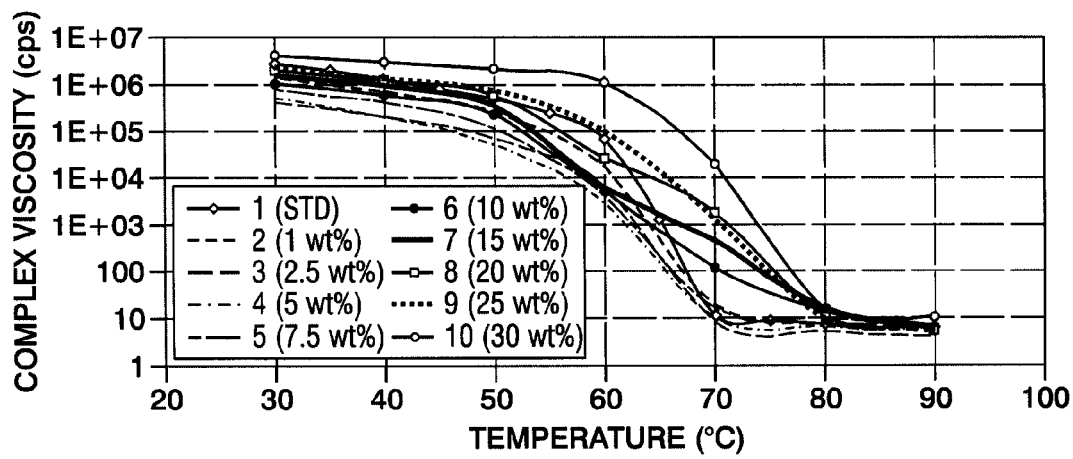
FIG. 1 depicts the rheological profiles of ten ink compositions.

The composition of the present disclosure is a radiation curable phase change ink. In the embodiments, the radiation curable ink comprises an ink vehicle that includes at least one curable carrier, at least one gellant, at least one radiation curable wax and at least one photoinitiator.

As the at least one gellant, compounds of the formula

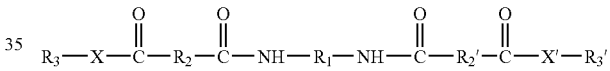

may be used wherein:

$R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), with from, for example, 1 to about 20 carbon atoms in the alkylene chain, such as from 1 to about 12 or from 1 to about 4 carbon atoms, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), with from, for example, about 5 to about 20 carbon atoms in the arylene chain, such as from about 6 to about 14 or from about 6 to about 10 carbon atoms, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), with from, for example, about 6 to about 32 carbon atoms in the arylalkylene chain, such as from about 7 to about 22 or from about 7 to about 20 carbon atoms, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), with from, for example, about 6 to about 32 carbon atoms in the alkylarylene chain, such as from about 7 to about 22 or from about 7 to about 20 carbon atoms, wherein the substituents on the substituted alkylene, arylene, arylalkylene, and alkylarylene groups can be, for example, halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), with from, for example, 1 to about 54 carbon atoms in the alkylene chain, such as from 1 to about 44 or from 1 to about 36 carbon atoms, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), with from, for example, 5 to about 14 carbon atoms in the arylene chain, such as from 6 to about 14 or from 7 to about 10 carbon atoms, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), with from, for example, about 6 to about 32 carbon atoms in the arylalkylene chain, such as from about 7 to about 22 or from 8 to about 20 carbon atoms, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), with from, for example, about 6 to about 32 carbon atoms in the alkylarylene chain, such as from about 7 to about 22 or from about 7 to about 20 carbon atoms, wherein the substituents on the substituted alkylene, arylene, arylalkylene, and alkylarylene groups can be, for example, halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3'$ each, independently of the other, are either:

(a) photoinitiating groups, such as groups derived from 1-(4-(9-hydroxyethoxy)phenyl)-2-hydroxy-2-methylpropan-1-one, of the formula

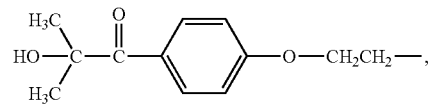

groups derived from 1-hydroxycyclohexylphenylketone, of the formula

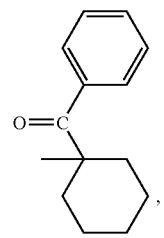

groups derived from 2-hydroxy-2-methyl-1-phenylpropan-1-one, of the formula

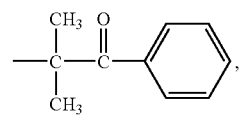

groups derived from N,N-dimethylethanolamine or N,N-dimethylethylenediamine, of the formula

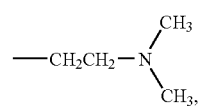

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), with from, for example, about 2 to 100 carbon atoms in the alkyl chain, such as from about 3 to about 60 or from about 4 to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group), with from, for example, about 5 to about 100 carbon atoms on the aryl chain, such as from about 5 to about 60 or from about 6 to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), with from, for example, about 6 to about 100 carbon atoms on the arylalkyl chain, such as from 6 to about 60 or from about 7 to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), with from, for example, about 6 to about 100 carbon atoms in the alkylaryl chain, such as from about 6 to about 60 or from about 7 to about 30 carbon atoms, such as tolyl or the like, wherein the substituents on the substituted alkyl, arylalkyl, and alkylaryl groups can be, for example, halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

and X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, with from, for example, 1 to about 100 carbon atom in the alkyl chain, such as from 1 to about 60 or from 1 to about 30 carbon atoms, (iii) an aryl group, including substituted and unsubstituted aryl groups, and wherein heteroatoms either may or may not be present in the aryl group, with from, for example, about 5 to about 100 carbon atoms in the aryl chain, such as from about 5 to about 60 or about 6 to about 30 carbon atoms, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, with from, for example, about 6 to about 100 carbon atoms in the arylalkyl group, such as from about 6 to about 60 or from about 7 to about 30 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, with from, for example, about 6 to about 100 carbon atoms in the alkylaryl chain, such as from about 6 to about 60 or from about 7 to about 30 carbon atoms, wherein the substituents on the substituted alkyl, aryl, arylalkyl, and alkylaryl groups can be, for example, halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, $R_2$ and $R_2'$ are the same as each other; in another specific embodiment, $R_2$ and $R_2'$ are different from each other. In one specific embodiment, $R_3$ and $R_{31}$ are the same as each other; in another specific embodiment, $R_3$ and $R_3'$ are different from each other.

In one specific embodiment, $R_2$ and $R_2'$ are each groups of the formula —$C_{34}H_{56+a}$— and are branched alkylene groups which may include unsaturations and cyclic groups, wherein a is an integer of 0, 1, 2, 3, 4, 5, 6, 7, 8, 9, 10, 11, or 12, including, for example, isomers of the formula

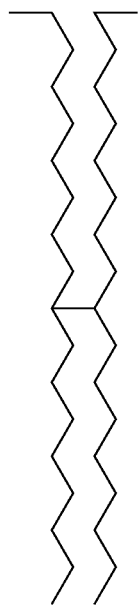

in one specific embodiment, $R_1$ is an ethylene (—$CH_2CH_2$—) group.

In one specific embodiment, at least one of $R_3$ and $R_3'$ is of the formula

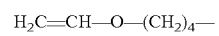

In another specific embodiment, at least one of $R_3$ and $R_3'$ is of the formula

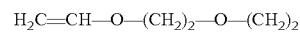

In yet another specific embodiment, at least one of $R_3$ and $R_3'$ is of the formula

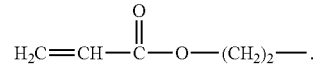

In still another specific embodiment, at least one of $R_3$ and $R_3'$ is of the formula

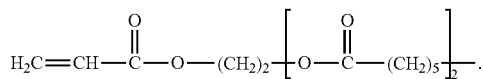

In another specific embodiment, at least one of $R_3$ and $R_3'$ is of the formula

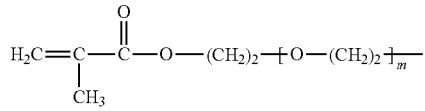

wherein m is an integer representing the number of repeating $[O\text{—}(CH_2)_2]$ units, and is in one specific embodiment 2 and is in another specific embodiment 5.

In yet another specific embodiment, at least one of $R_3$ and $R_3'$ is of the formula

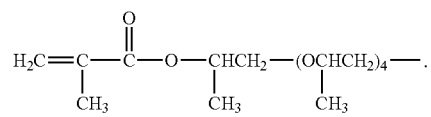

In one specific embodiment, at least one of $R_3$ and $R_3'$ is

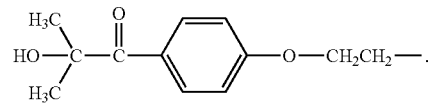

In embodiments, the gellant is of the formula

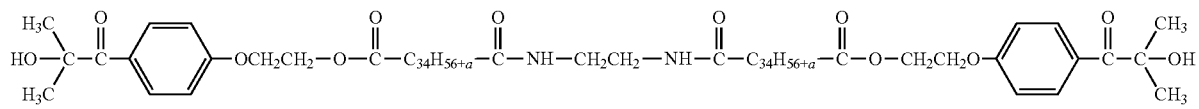

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12, including, for example, isomers of the formula

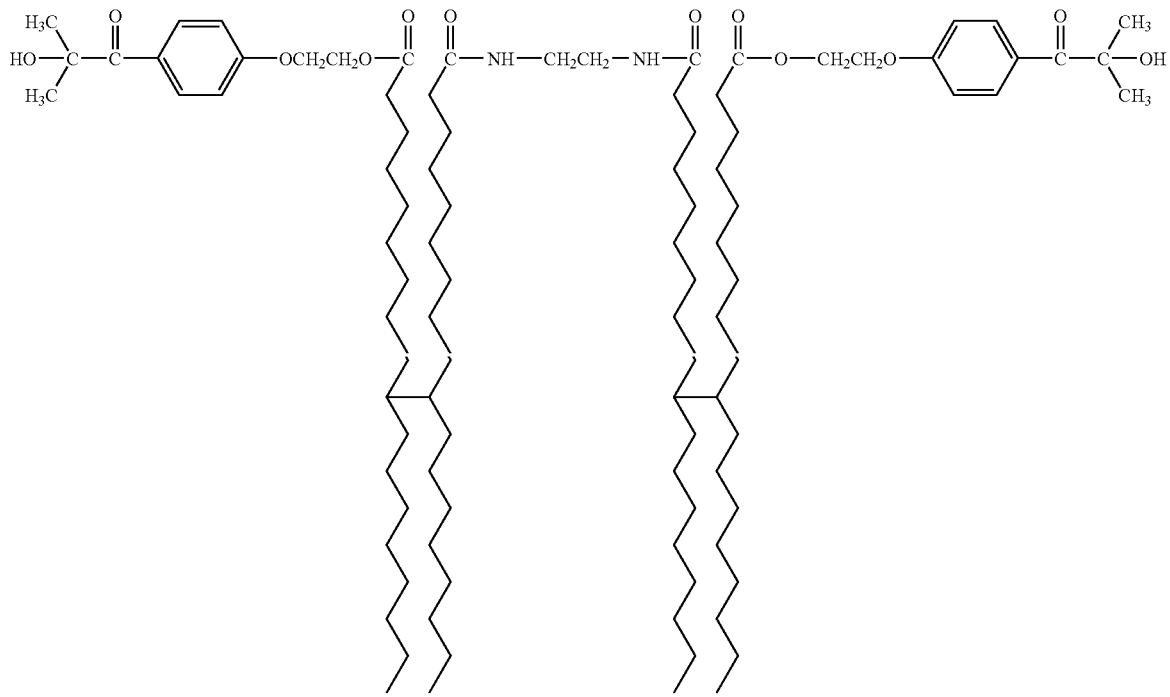

Additional specific examples of gellants of this formula include those of the formula

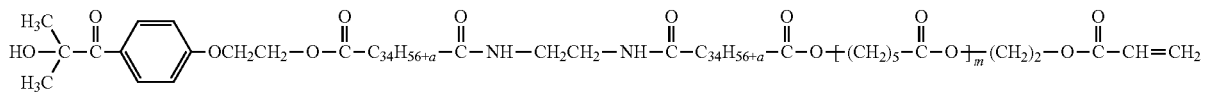

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12, and wherein m is an integer, for example including embodiments wherein m is 2, including isomers of the formula

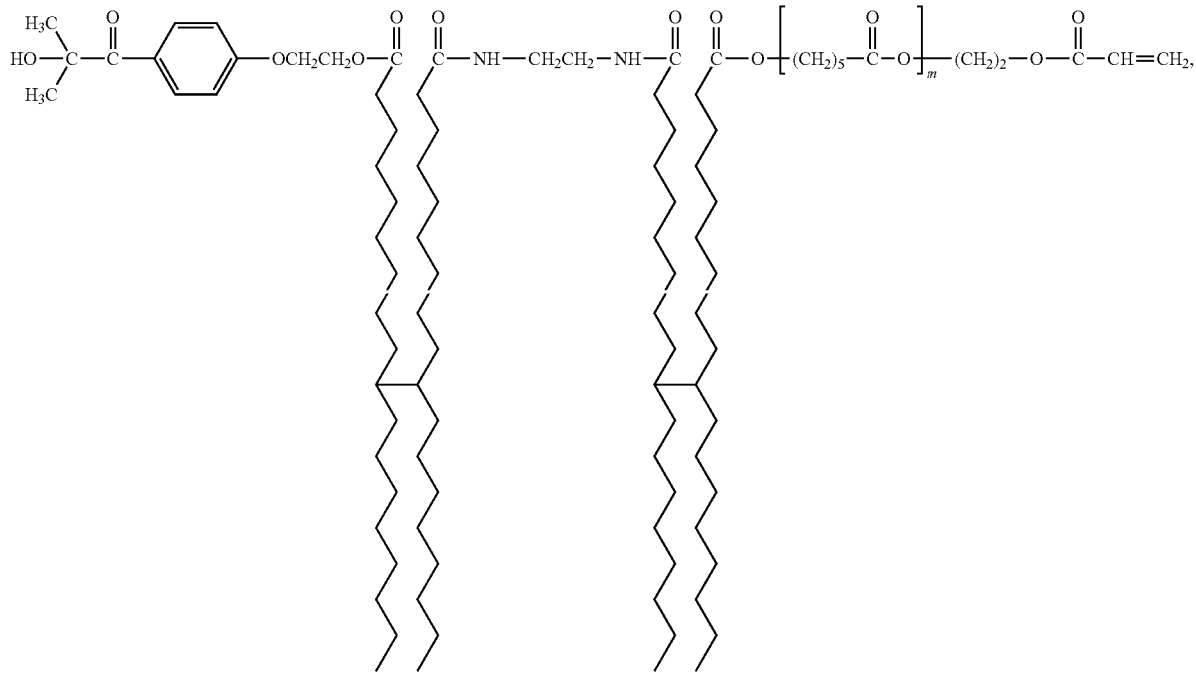

those of the formula

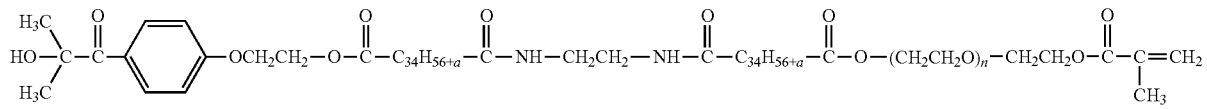

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein n is a integer, for example including embodiments wherein n is 2 and wherein n is 5, including for example, isomers of the formula

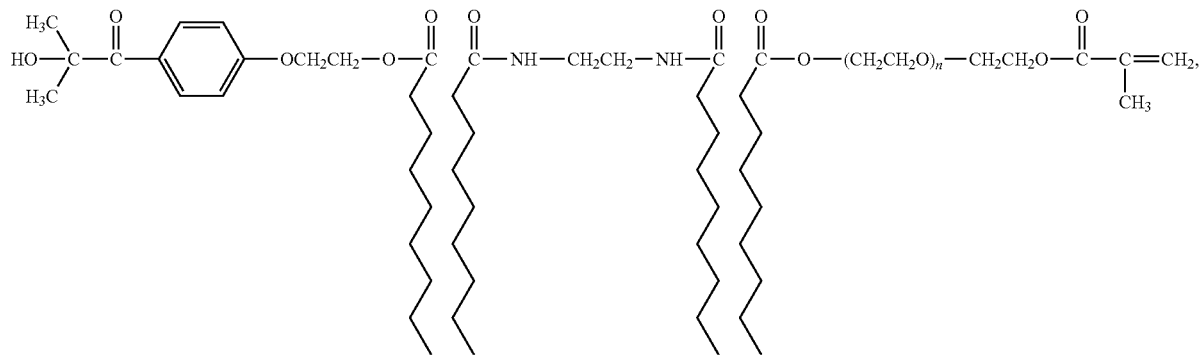

those of the formula
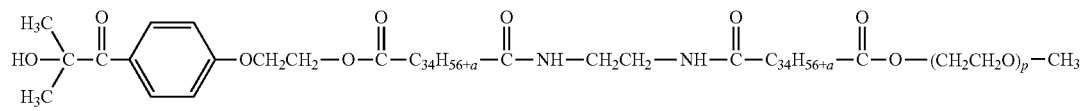
wherein —$C_{34}H_{56+a}$— represents a branched alkylene group which may include unsaturations and cyclic groups, wherein a is an integer of 0, 1, 2, 3, 4, 5, 6, 7, 9, 10, 11, or 12 and wherein p is an integer, for example including embodiments wherein p is 2 and wherein p is 3, for example including isomers of the formula
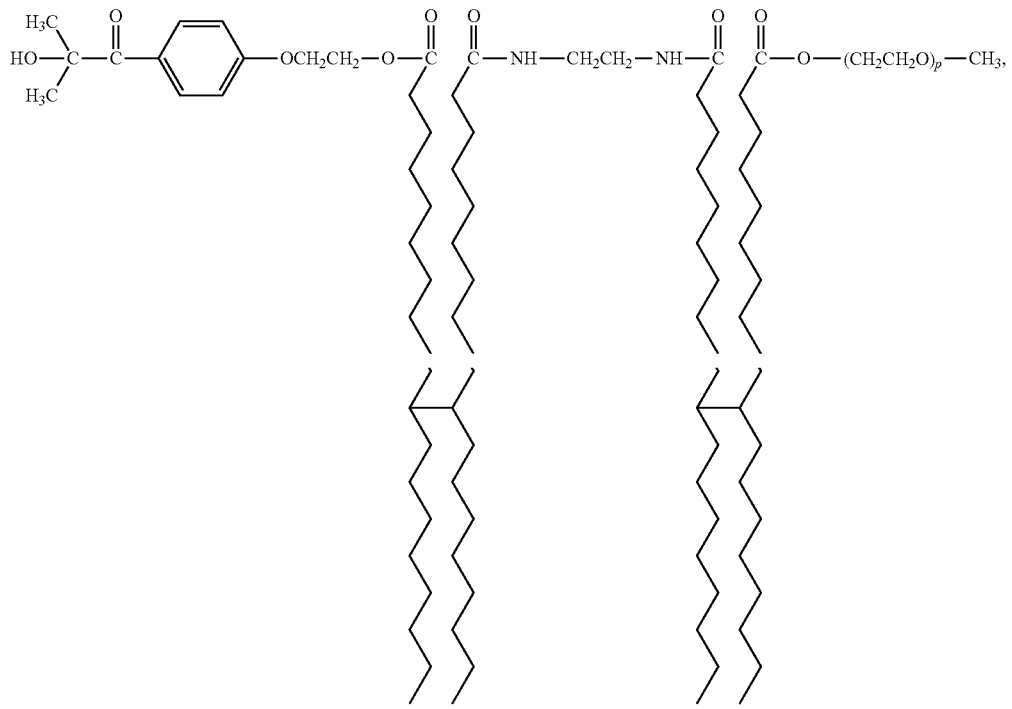

those of the formula

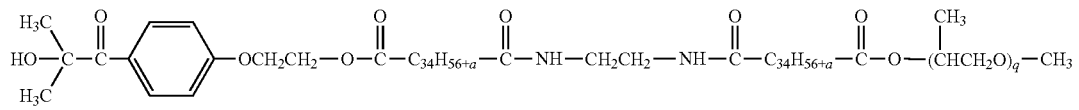

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein q is an integer, for example including embodiments wherein q is 2 and wherein q is 3, including for example, isomers of the formula

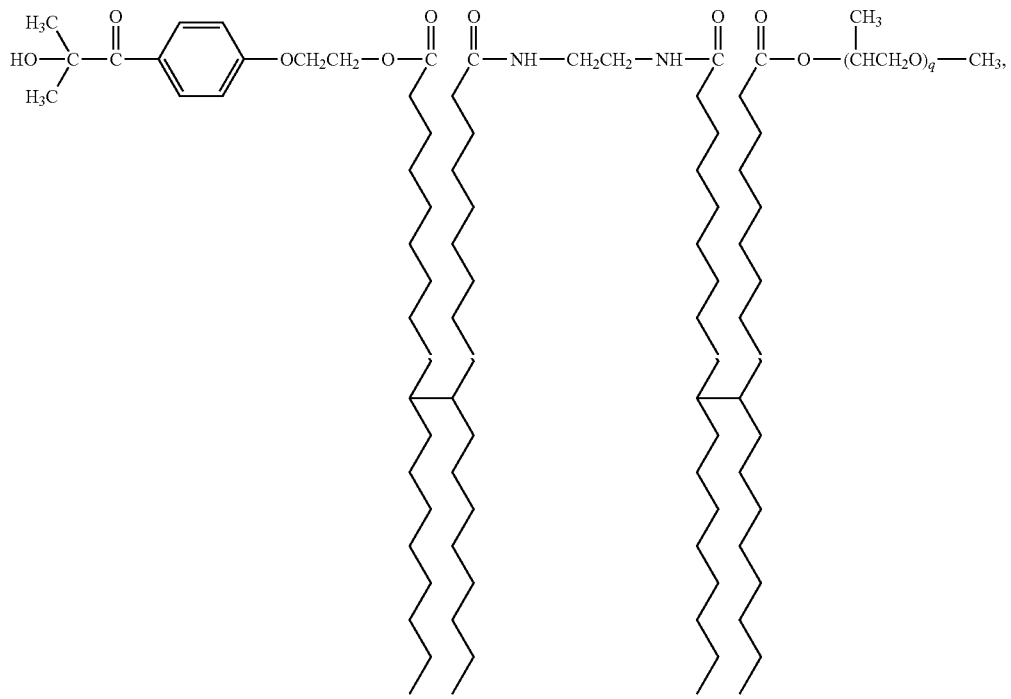

those of the formula

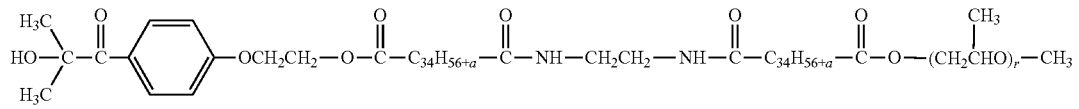

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein r is an integer, for example including embodiments wherein r is 2 and wherein r is 3, including for example, isomers of the formula

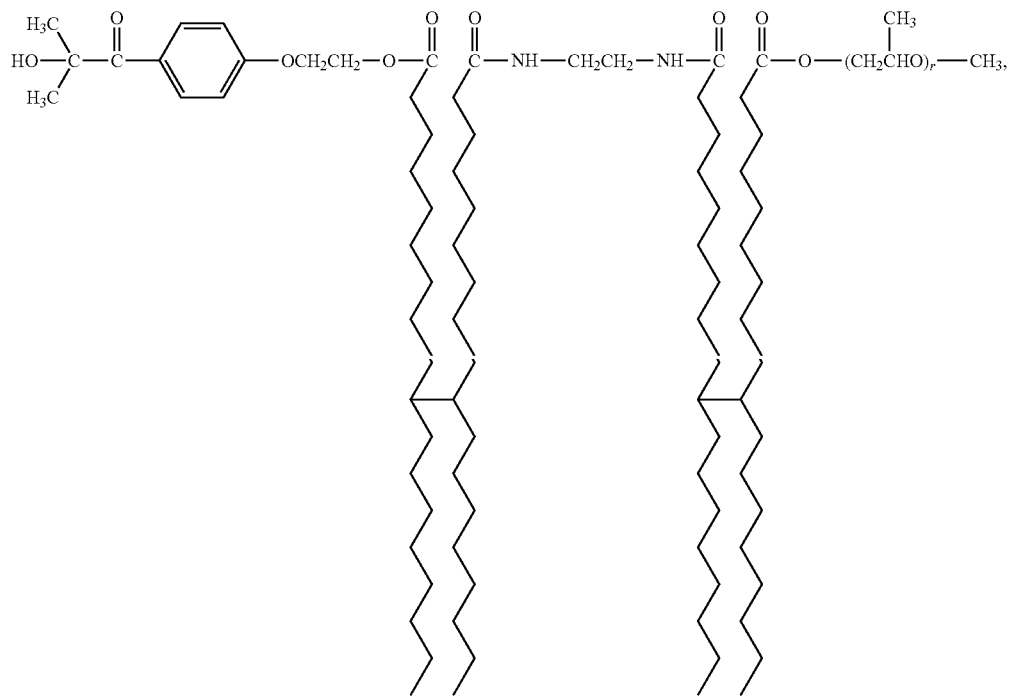

and the like, as well as mixtures thereof.

In embodiments, the gellant is a mixture, including a mixture of all three, of

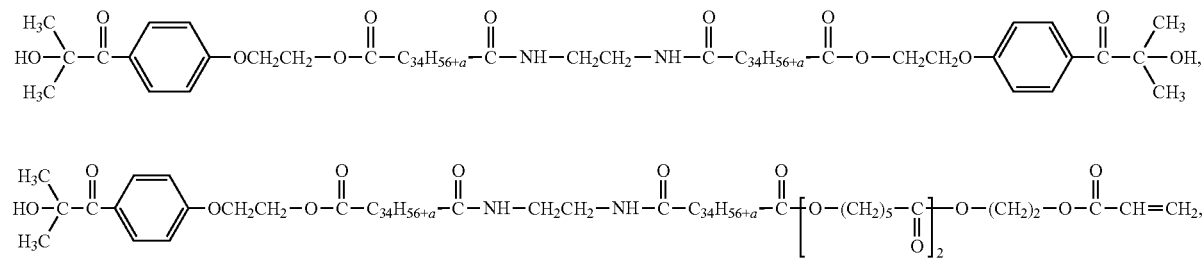

and

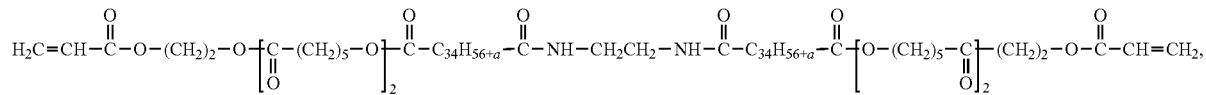

wherein —$C_{34}H_{56}+_3$— represents a branched alkylene group which may include unsaturations and cyclic groups, wherein a is an integer of 0, 1, 2, 3, 4, 5, 6, 7, 8, 9, 10, 11, or 12. Desirably, when all three compounds are used together as the gellant, the compounds are present in molar ratios of about 1:2:1 with respect to the first listed above: second listed above: third listed above.

Additional specific examples of suitable gellant compounds of the general formula above include those of the formula

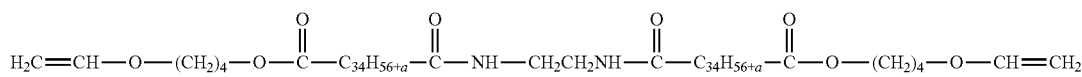

wherein —$C_{34}H_{56+a}$— represents a branched alkylene group which may include unsaturations and cyclic groups, wherein a is an integer of 0, 1, 2, 3, 45, 6, 7, 8, 9, 10, 11, or 12, including isomers of the formula
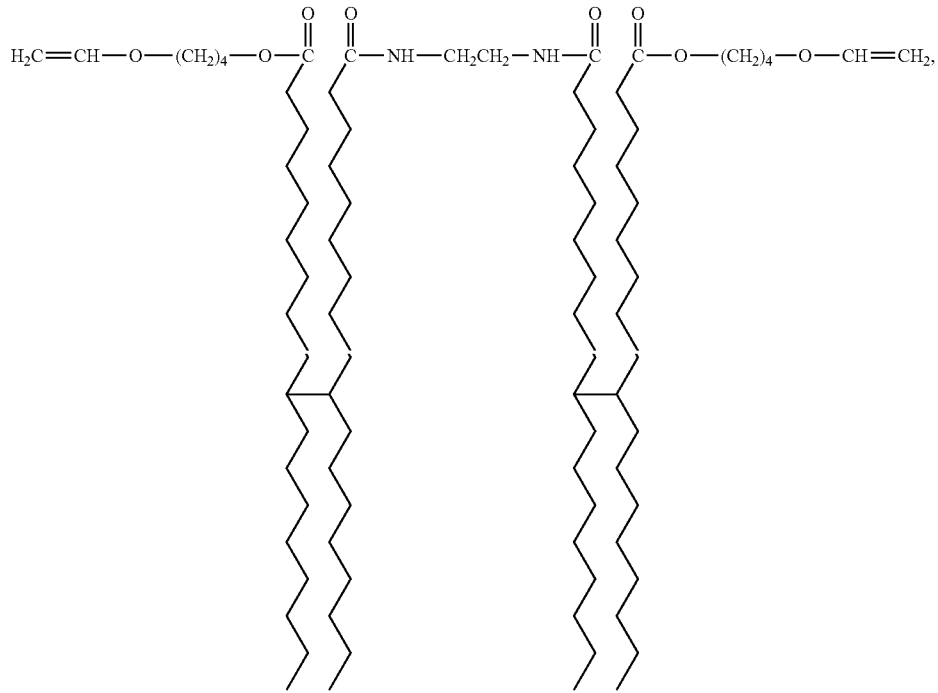
those of the formula
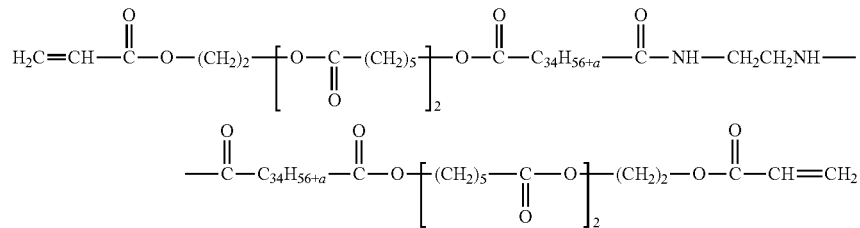
wherein —$C_{34}H_{56}+_3$— represents a branched group which may include unsaturations and cyclic groups, wherein a is an integer of 0, 1, 2, 3, 4, 5, 6, 7, 8, 9, 10, 11, or 12, including isomers of the formula
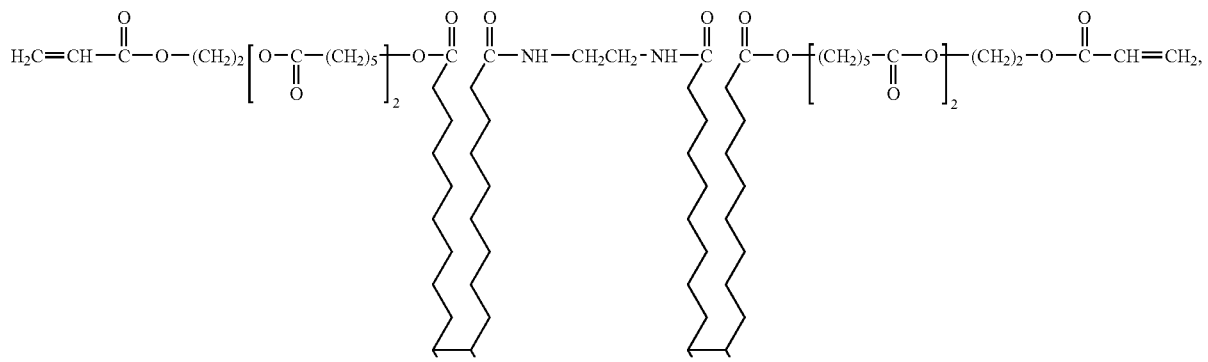

as well as mixtures thereof.

The gellant compounds as disclosed herein can be prepared by any desired or effective method. For example, in one specific embodiment, about two molar equivalents of a diacid of the formula

HOOC—$R_2$—COOH about one molar equivalent of a diamine of the formula $H_2N$—$R_2$—$NH_2$ and about two molar equivalents of a monoalcohol of the formula $R_3$—OH can be reacted by use of the coupling agent such as 1,3-dicyclohexylcarbodiimide (DCC) in the presence of a catalyst such as 4-dimethylaminopyridine (DMAP), in the presence of an optional solvent such as methylene chloride ($CH_2Cl_2$). The ingredients can be mixed together and a one-pot reaction can be employed. More specifically, the diacid, the diamine, and the coupling agent can be mixed together in a first step, and the monoalcohol can be added to the reaction mixture in a second step. The reaction proceeds as follows:

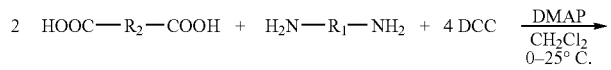
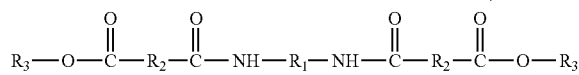

wherein A is the coupling agent.

The diacid and the diamine are present in any desired or effective relative amounts, for example in one embodiment at least about 0.4 mole of diamine per every 1 mole of diacid, in another embodiment at least about 0.45 mole of diamine per every 1 mole of diacid, and in yet another embodiment at least about 0.5 mole of diamine per every one mole of diacid, and in one embodiment no more than about 0.57 mole of diamine per every 1 mole of diacid, in another embodiment no more than about 0.53 mole of diamine per every 1 mole of diacid, and in yet another embodiment no more than about 0.51 mole of diamine per every 1 mole of diacid.

The diacid and the monoalcohol are present in any desired or effective relative amounts, in one embodiment at least about 0.75 mole of monoalcohol per every 1 mole of diacid, in another embodiment at least about 0.9 mole of monoalcohol per every 1 mole of diacid, and in yet another embodiment at least about 1 mole of monoalcohol per every one mole of diacid, and in one embodiment no more than about 1.5 moles of monoalcohol per every 1 mole of diacid, in another embodiment no more than about 1.4 moles of monoalcohol per every 1 mole of diacid, and in yet another embodiment no more than about 1.25 moles of monoalcohol per every 1 mole of diacid.

The diamine and the monoalcohol are present in any desired or effective relative amounts, for example in one embodiment at least about 1.5 moles of monoalcohol per every 1 mole of diamine, in another embodiment at least about 1.75 moles of monoalcohol per every 1 mole of diamine, and in yet another embodiment at least about 2 moles of monoalcohol per every one mole of diamine, and in one embodiment no more than about 2.5 moles of monoalcohol per every 1 mole of diamine, in another embodiment no more than about 2.4 moles of monoalcohol per every 1 mole of diamine, and in yet another embodiment no more than about 2.25 moles of monoalcohol per every 1 mole of diamine.

Examples of suitable coupling agents include 1,3-dicyclohexylcarbodiimide (DCC), of the formula

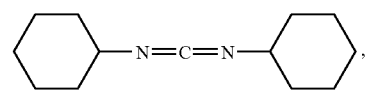

1-[3-(dimethylamino)propyl]3-ethylcarbodiimide HCl (EDCl), N,N-carbonyldiimidazole, N-cyclohexyl-N'-(2-morpholinoethyl)-carbodiimide methyl-p-toluenesulfonate, (benzotriazol-1-yloxy)tris(dimethylamino)phosphonium hexafluorophosphate (BOP), (o-benzotriazol-1-yl)-N,N,N', N'-bis(tetramethlylene)uronium hexafluorophosphate (HBTU), bis(2-oxo-3-oxazolidinyl)phosphonic chloride (BOP—Cl), (1H-1,2,3-benzotriazol-1-yloxy)tris(pyrrolidino)phosphonium hexafluorophosphate (PyBOP), and the like, as well as mixtures thereof.

The coupling agent and the diacid are present in any desired or effective relative amounts, for example in one embodiment at least about 0.4 mole of diacid per every 1 mole of coupling agent, in another embodiment at least about 0.45 mole of diacid per every 1 mole of coupling agent, and in yet another embodiment at least about 0.5 mole of diacid per every one mole of coupling agent, and in one embodiment no more than about 0.57 mole of diacid per every 1 mole of coupling agent, in another embodiment no more than about 0.53 mole of diacid per every 1 mole of coupling agent, and in yet another embodiment no more than about 0.51 mole of diacid per every 1 mole of coupling agent.

Examples of suitable catalysts include 4-dimethylaminopyridine (DMAP), of the formula

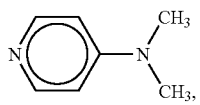

triethylamine, 1,8-diazabicyclo[5.4.0]undec-7-ene (DBU), and the like, as well as mixtures thereof.

The catalyst and the diacid are present in any desired or effective relative amounts, for example in one embodiment at least about 0.05 mole of catalyst per every 1 mole of diacid, in another embodiment at least about 0.1 mole of catalyst per every 1 mole of diacid, and in yet another embodiment at least about 0.2 mole of catalyst per every one mole of diacid, and in one embodiment no more than about 1 mole of catalyst per every 1 mole of diacid, in another embodiment no more than about 0.8 mole of catalyst per every 1 mole of diacid, and in yet another embodiment no more than about 0.5 mole of catalyst per every 1 mole of diacid.

When the optional solvent is employed, any desired or effective solvent can be employed. Examples of suitable solvents include methylene chloride, tetrahydrofuran, methyl ethyl ketone, toluene, dimethyl formamide, diethyl ether, hexane, ethyl acetate, and the like, as well as mixtures thereof.

When the optional solvent is employed, the solvent can be present in any desired or effective amount, for example in one embodiment at least about 30 grams of diacid per liter of solvent, in another embodiment at least about 40 grams of diacid per liter of solvent, and in yet another embodiment at least about 50 grams of diacid per liter of solvent, and in one embodiment no more than about 150 grams of diacid per liter of solvent, in another embodiment no more than about 125 grams of diacid per liter of solvent, and in yet another embodiment no more than about 1100 grams of diacid per liter of solvent.

The reaction between the diacid and the diamine in the first step of the reaction can be carried out at any desired or effective temperature, for example in one embodiment at least about −5° C., in another embodiment at least about −2.5° C., and in yet another embodiment at least about 0° C., and one embodiment no more than about 2° C., in another embodiment no more than about 10° C., and in yet another embodiment no more than about 5° C. Thereafter, the reaction product of the diacid and diamine can be reacted with the monoalcohol at any desired or effective temperature, for example in one embodiment at least about 15° C., in another embodiment at least about 20° C., and in yet another embodiment at least about 25° C., and one embodiment no more than about 45° C., in another embodiment no more than about 35° C., and in yet another embodiment no more than about 30° C.

The reaction between the diacid, the diamine, and the monoalcohol can be carried out for any desired or effective period of time, for example in one embodiment from about 1 hour to about 11 hours, in another embodiment from about 2 hours to about 7 hours, and in yet another embodiment from about 4 hours to about 5 hours.

Subsequent to completion of the reaction, the product can be isolated by filtration of any solid by-products, or by washing the solution with water depending on the activating agent used. The solvent can be removed by rotary evaporation. If needed, the product can be purified by washing with acetone and drying.

The gellant compounds as disclosed herein can also be prepared by first reacting about two molar equivalents of a diacid of the formula $$HOOC-R_2-COOH$$

and about one molar equivalent of a diamine of the formula $$H_2N-R_1-NH_2$$

under neat conditions (that is, in the absence of a solvent) at elevated temperatures while removing water from the reaction mixture to form an acid-terminated oligoamide of the formula

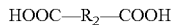

Thereafter, the acid-terminated oligoamide thus formed can be reacted with about 2 molar equivalents of a monoalcohol of the formula $R_3$—OH by use of a coupling agent such as 1,3-dicyclohexylcarbodiimide (DCC) in the presence of a catalyst such as 4-dimethylaminopyridine (DMAP) in the presence of a solvent such as methylene chloride ($CH_2Cl_2$) at reduced temperatures. The reaction may proceed as follows:

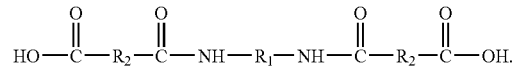

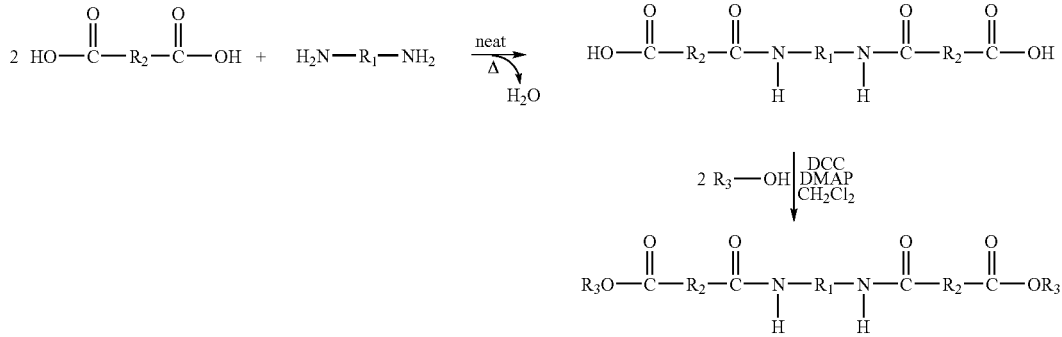

The diacid and the diamine are present in any desired or effective relative amounts, for example in one embodiment at least about 0.75 mole of diamine per every 2 moles of diacid, in another embodiment at least about 0.85 mole of diamine per every 2 moles of diacid, and in yet another embodiment at least about 1 mole of diamine per every 2 moles of diacid, and in one embodiment no more than about 1.5 moles of diamine per every 2 moles of diacid, in another embodiment no more than about 1.35 moles of diamine per every 2 moles of diacid, and in yet another embodiment no more than about 1.25 moles of diamine per every 2 moles of diacid.

Water can be removed from the reaction mixture between the diacid and the diamine by any desired or effective method, such as by a Dean-Stark trap, molecular sieves or other drying agents, or the like.

The reaction between the diacid and the diamine generally is run neat, although a solvent can be used if desired.

The reaction between the diacid and the diamine can be carried out at any desired or effective temperature, for example in one embodiment from about 130° C. to about 180° C., in another embodiment from about 140° C. to about 175° C., and in yet another embodiment from about 155° C. to about 165° C.

The reaction between the diacid and the diamine can be carried out for any desired or effective period of time, for example in one embodiment from about 1 hour to about 7 hours, in another embodiment from about 2 hours to about 5 hours, and in yet another embodiment from about 3 hours to about 4 hours.

Thereafter, the acid-terminated oligoamide intermediate and the monoalcohol are reacted in the presence of a coupling agent, a catalyst, and a solvent.

The acid-terminated oligoamide intermediate and the monoalcohol are present in any desired or effective relative amounts, for example in one embodiment at least about 2 moles of monoalcohol per every 1 mole of acid-terminated oligoamide intermediate, in another embodiment at least about 2.15 moles of monoalcohol per every 1 mole of acid-terminated oligoamide intermediate, and in yet another embodiment at least about 2.25 moles of monoalcohol per every one mole of acid-terminated oligoamide intermediate, and in one embodiment no more than about 3 moles of monoalcohol per every 1 mole of acid-terminated oligoamide intermediate, in another embodiment no more than about 2.5 moles of monoalcohol per every 1 mole of acid-terminated oligoamide intermediate, and in yet another embodiment no more than about 2,4 moles of monoalcohol per every 1 mole of acid-terminated oligoamide intermediate.

The acid-terminated oligoamide and the coupling agent are present in any desired or effective relative amounts, for example in one embodiment at least about 1.8 moles of coupling agent per every 1 mole of diacid diamide, in another embodiment at least about 2 moles of coupling agent per every 1 mole of diacid diamide, and in yet another embodiment at least about 2.2 moles of coupling agent per every one mole of diacid diamide, and in one embodiment no more than about 3 moles of coupling agent per every 1 mole of diacid diamide, in another embodiment no more that about 2.8 moles of coupling agent per every 1 mole of diacid diamide, and in yet another embodiment no more than about 2.5 moles of coupling agent per every 1 mole of diacid diamide.

The catalyst and the acid-terminated oligoamide intermediate are present in any desired or effective relative amounts, for example in one embodiment at least about 0.05 mole of catalyst per every 1 mole of acid-terminated oligoamide intermediate, in another embodiment at least about 0.1 moles of catalyst per every 1 mole of acid-terminated oligoamide intermediate, and in yet another embodiment at least about 0.2 mole of catalyst per every one mole of acid-terminated oligoamide intermediate, and in one embodiment no more than about 1 mole of catalyst per every 1 mole of acid-terminated oligoamide intermediate, in another embodiment no more than about 0.8 mole of catalyst per every 1 mole of acid-terminated oligoamide intermediate, and in yet another embodiment no more than about 0.5 mole of catalyst per every 1 mole of acid-terminated oligoamide intermediate, The solvent can be present in any desired or effective amount, for example in one embodiment from about 20 milliliters of solvent per gram of acid-terminated oligoamide intermediate to about 100 milliliters of solvent per gram of acid-terminated oligoamide intermediate, in another embodiment from about 20 milliliters of solvent per gram of acid-terminated oligoamide intermediate to about 90 milliliters of solvent per gram of acid-terminated oligoamide intermediate, and in yet another embodiment from about 30 milliliters of solvent per gram of acid-terminated oligoamide intermediate to about 80 milliliters of solvent per gram of acid-terminated oligoamide intermediate.

The reaction between the acid-terminated oligoamide intermediate, the monoalcohol, and the coupling agent can be carried out at any desired or effective temperature, for example in one embodiment from about 10° C. to about 60° C., in another embodiment from about 15° C. to 40° C., in yet another embodiment from about 20° C. to 35° C.

The reaction between the acid-terminated oligoamide intermediate, the monoalcohol, and the coupling agent can be carried out for any desired or effective period of time, for example in one embodiment from about 1 hour to about 7 hours, in another embodiment from about 2 hours to about 7 hours, and in yet another embodiment from about 2 hours to about 5 hours, and in one embodiment no more than about 3 hours, and in another embodiment no more than about 4 hours.

Subsequent to completion of the reaction, the product can be recovered by any desired or effective method, such as filtration of any solid by-products or washing the solution with water depending on the coupling agent used. The solvent can be removed by rotary evaporation. If needed, the product can be purified by washing with acetone and dried in a vacuum oven.

Analogous procedures can be employed using amine compounds of the formula $HNR_3R_4$ in place of monoalcohols of the formula $R_3OH$.

Many embodiments of the compounds thus prepared can exhibit gel-like behavior in that they undergo a relatively sharp increase in viscosity over a relatively narrow temperature range when dissolved in a liquid carrier such as those compounds that behave as curable monomers when exposed to radiation such as ultraviolet light. One example of such a liquid carrier is a propoxylated neopentyl glycol diacrylate such as SR9003, commercially available from Sartomer Co. Inc. In embodiments, some compounds as disclosed herein undergo a change in viscosity of, for example, at least about $10^3$ centipoise, in further embodiments at least about $10^5$ centipoise, and in yet further embodiments at least about $10^6$ centipoise over a temperature range of, for example, in one embodiment at least about 30° C., in another embodiment at least about 10° C., and in yet another embodiment at least about 5° C., and compounds that do not undergo changes within these ranges are also included herein.

The curable inks disclosed herein may form a semi-solid gel at a first temperature. For example, when the gellant is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

The gellant compositions disclosed herein are present in the phase change ink in any desired or effective amount, in one embodiment from about 1 to about 25 percent by weight of the ink vehicle, and in another amount from about 1 to about 10 percent by weight of the ink vehicle, and in one embodiment from about 7 to about 10 percent by weight of the ink vehicle.

The gellant compositions disclosed herein can, in at least some embodiments, act as an organic gellant in the ink to the viscosity of the ink within a desired temperature range. In particular, the gellant can in some embodiments form a semi-solid gel in the ink vehicle at temperatures below the specific temperature at which the ink is jetted.

As the at least one carrier, examples of a suitable ink carrier materials include curable monomer compounds, such as acrylate, methacrylate, alkene, vinyl ether, allylic ether, epoxide and oxetane compounds and mixtures thereof. Specific examples of relatively nonpolar acrylate and methacrylate monomers include, for example, isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartorner Co. Inc. as SR9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures thereof. When a reactive diluent is added to the ink carrier material, the reactive diluent is added in any desired or effective amount, in one embodiment from about 1 percent by weight of the carrier to about 80 percent by weight of the carrier, and in another embodiment from about 1 percent by weight of the carrier to about 70 percent by weight of the carrier, and in yet another embodiment from about 35 percent by weight of the carrier to about 70 percent by weight of the carrier.

The ink carrier is present in the phase change ink in any desired or effective amount, in one embodiment from about 0.1 percent by weight of the ink to about 98 percent by weight of the ink, in another embodiment from about 50 percent by weight of the ink to about 98 percent by weight of the ink, and in yet another embodiment from about 90 percent by weight of the ink to about 95 percent by weight of the ink.

The phase change ink further contains at least one wax. The wax can be curable or non-curable. The wax may be any wax component that is miscible with the other ink components. Inclusion of the wax promotes an increase in viscosity of the ink as it cools from the jetting temperature.

Desirably, the wax composition is curable so as to participate in the curing of the ink. Suitable examples of UV curable waxes include those that are functionalized with curable groups. The curable groups may include, for example, acrylate, methacrylate, alkene, allylic ether, epoxide and/or oxetane groups. These waxes can be synthesized by the reaction of a wax equipped with a transformable functional group, such as carboxylic acid, hydroxyl and the like. The functionalized wax is also able to participate in the ultraviolet light initiated cure and thus does not lower the final robustness of the image. Additionally, the wax acts as a binder, preventing syneresis, and in printing, acts as a barrier or coating on paper/image receiving substrate, preventing the principle carrier from wicking or showing through the paper. The curable wax also reduces haloing tendency.

Suitable examples of hydroxyl-terminated polyethylene waxes that may be functionalized with a curable group include, for example, mixtures of carbon chains with the structure $CH_3-(CH_2)_n-CH_2OH$, where there is a mixture of chain lengths, n, where the average chain length is for example in the range of about 16 to about 50, and linear low molecular weight polyethylene, of similar average chain length. Suitable examples of such waxes include, for example, UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. Other suitable examples include alcohols of the formula $CH_3(CH_2)_n CH_2OH$, where n=20–50. Guerbet alcohols, characterized as 2,2-dialkyl-1-ethanols, are also suitable compounds. For example, Guerbet alcohols include those containing 16 to 36 carbons, many of which are commercially available from Jarchem Industries Inc., Newark, N.J. PRIPOL® 2033 (C-36 dimer diol mixture including isomers of the formula

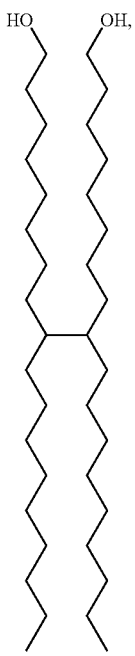

as well as other branched isomers which may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference) can also be used. These alcohols can be reacted with carboxylic acids equipped with UV curable moieties to form reactive esters. Examples of these acids include, for example, acrylic and methacrylic acids, available from Sigma-Aldrich Co. Particularly suitable curable moieties include acrylates of UNILIN® 350, UNILIN® 425, UNILIN® 550 and UNILIN® 700.

Suitable examples of carboxylic acid-terminated polyethylene waxes that may be functionalized with a curable group include, for example, mixtures of carbon chains with the structure $CH_3-(CH_2)_n-COOH$, where there is a mixture of chain lengths, n, where the average chain length is, for example, from about 16 to about 50, and linear low molecular weight polyethylene, of similar average chain length. Suitable examples of such waxes include, for example, UNICID® 350, UNICID® 425, UNICID® 550 and UNICID® 700 with M, equal to approximately 390, 475, 565 and 720 g/mol, respectively. Other suitable examples have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. For example, Guerbet acids include those containing 16 to 36 carbons, many of which are commercially available from Jarchem Industries Inc., Newark, N.J. PRIPOL® 1009 (C-36 dimer acid mixture including isomers of the formula

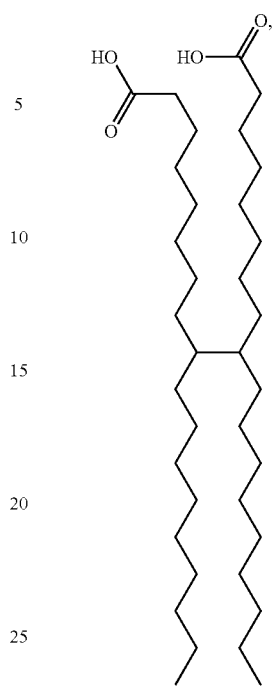

as well as other branched isomers which may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference) can also be used. These carboxylic acids can be reacted with alcohols equipped with UV curable moieties to form reactive esters. Examples of these alcohols include, for example, 2-allyloxyethanol and 1,4-butanediol vinyl ether, both available from Sigma-Aldrich Co.; alcohols of

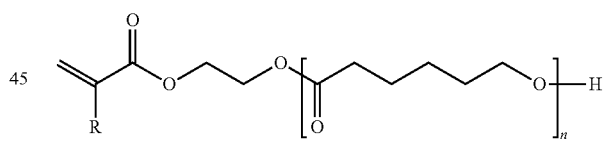

available as TONE M-101 (R=H, $n_{avg}$=1), TONE M-100 (R=H, $n_{avg}$=2) and TONE M-201 (R=Me, $n_{avg}$=1) from The Dow Chemical Company; and

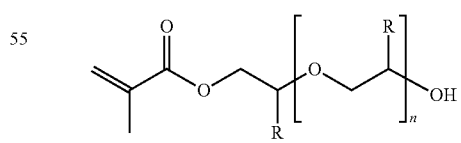

CD572 (R=H, n=10) and SR604 (R=Me, n=4) from Sartomer Company, Inc.

Other suitable examples of curable waxes include, for example, $AB_2$ diacrylate hydrocarbon compounds that may be prepared by reacting $AB_2$ molecules with acryloyl halides, and then further reacting with aliphatic long-chain, monofunctional aliphatic compounds. Suitable functional groups useful as A groups in embodiments include carboxylic acid groups and the like. Suitable functional groups useful as B groups in embodiments may be hydroxyl groups, thiol groups, amine groups, amide groups, imide groups, phenol groups, and mixtures thereof. Exemplary $AB_2$ molecules include, for example, bishydroxy alkyl carboxylic acids ($AB_2$ molecules in which A is carboxylic acid and B is hydroxyl), 2,2-bis(hydroxymethyl) butyric acid, N,N-bis(hydroxyethyl) glycine, 2,5-dihydroxybenzyl alcohol, 3,5-bis(4-aminophenoxy)benzoic acid, and the like. Exemplary $AB_2$ molecules also include those disclosed in Jikei et al. (Macromolecules, 33, 6228-6234 (2000)).

In embodiments, the acryloyl halide may be chosen from acryloyl fluoride, acryloyl chloride, acryloyl bromide, and acryloyl iodide, and mixtures thereof. In particular embodiments, the acryloyl halide is acryloyl chloride.

Exemplary methods for making $AB_2$ molecules may include optionally protecting the B groups first. Methods for protecting groups such as hydroxyls will be known to those of skill in the art. An exemplary method for making $AB_2$ molecules such as 2,2-bis(hydroxylmethyl)proprionic acid is the use of benzaldehyde dimethyl acetal catalyzed by a sulfonic acid such as p-toluene sulfonic acid in acetone at room temperature to form benzylidene-2,2-bis(oxymethyl)proprionic acid. This protected $AB_2$ molecule may be subsequently coupled with an aliphatic alcohol Suitable aliphatic alcohols include stearyl alcohol; 1-docosanol; hydroxyl-terminated polyethylene waxes such as mixtures of carbon chains with the stricture $CH_3—(CH_2)_n—CH_2OH$, where there is a mixture of chain lengths, n, having an average chain length, in some embodiments, in the range of about 12 to about 100; and linear low molecular weight polyethylenes that have an average chain length similar to that of the described hydroxyl-terminated polyethylene waxes. Suitable examples of such waxes include, but are not limited to, UNILIN 350, UNILIN 425, UNILIN 550 and UNILIN 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. In particular embodiments, the Guerbet alcohols may be chosen from Guerbet alcohols containing 16 to 36 carbon atoms; many such Guerbet alcohols are commercially available from Jarchem Industries Inc., Newark, N.J.

The acid group of the $AB_2$ monomer may be esterified by the aliphatic alcohol using p-toluenesulfonic acid in refluxing toluene. Following the reaction of the aliphatic alcohol with the protected $AB_2$ monomer, the protecting groups may be removed in methylene chloride using a palladium carbon catalyst under hydrogen gas. Once deprotected, the final product diacrylate aliphatic ester may be made using acryloyl chloride in methylene chloride with pyridine or triethylamine.

The curable wax is preferably included in the ink in an amount of from, for example, in one embodiment about 0.1% to about 50% by weight of the ink, in another embodiment from about 0.5% to about 40%, and in a further embodiment from about 1% to 30%.

The phase change inks further contain at least one initiator. Examples of suitable initiators include benzophenones, benzyl ketones, monomeric hydroxyl ketones, polymeric hydroxyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE and DAROCUR from Ciba, arylsulphonium salts, aryl iodonium salts and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyldiphenylphosphine oxide (available as BASF LUCIRIN TPO), 2,4,6-trimethylbenzoylethoxyphenylphosphine oxide (available as BASF LUCIRIN TPO-L), bis(2,4,6-trimethylbenzoyl)-phenyl-phosphine oxide (available as Ciba IRGACURE 819) and other acyl phosphines, 2-methyl-1-(4-methylthio)phenyl-2-(4-morphorlinyl)-1-propanone (available as Ciba IRGACURE 907) and 1-(4-(2-hydroxyethoxyphenyl)-2-hydroxy-2-methylpropan-1-one (available as Ciba IRGACURE 2959), 2-benzyl 2-dimethylamino 1-(4-morpholinophenyl) butanone-1 (available as Ciba IRGACURE 369), 2-hydroxy-1-(4-(4-(2-hydroxy-2-methylpropionyl)-benzyl)-phenyl)-2-methylpropan-1-one (available as Ciba IRGACURE 127), 2-dimethylamino-2-(4-methylbenzyl)-1-(4-morpholin-4-ylphenyl)-butanone (available as Ciba IRGACURE 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, CYRACURE UVI-6990 from Dow Chemical, R-GEN® BF-1172 from Chitec Chemical Co., 4-methylphenyl-(4-(2-methylpropyl)phenyl)iodonium hexafluorophosphate and the like, as well as mixtures thereof.

Optionally, the phase change inks can also contain an amine synergist, which are co-initiators that can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include, for example, ethyl-4-dimethylaminobenzoate, 2-ethylhexyl-4-dimethylaminobenzoate, and the like, as well as mixtures thereof.

Initiators that absorb radiation, for example UV light radiation, to initiate curing of the curable components of the ink may be used. Initiators for inks disclosed herein can absorb radiation at any desired or effective wavelength, for example in one embodiment from about 200 to 600 nanometers, and in one embodiment about 200 to 500 nanometers, and in another embodiment about 200-420 nanometers. Curing of the ink can be effected by exposure of the ink image to actinic radiation for any desired or effective period of time, in one embodiment from about 0.01 second to about 30 seconds, in another embodiment from about 0.01 second to about 15 seconds, and in yet another embodiment from about 0.01 second to about 5 seconds. By curing is meant that the curable compounds in the ink undergo an increase in molecular weight upon exposure to actinic radiation, such as crosslinking, chain lengthening, or the like.

The initiator can be present in the ink in any desired or effective amount, for example in one embodiment from about 0.5 percent by weight of the ink to about 20 percent by weight of the ink, and in another embodiment from about 1 percent by weight of the ink to about 20 percent by weight of the ink, and in yet another embodiment from about 1 percent by weight of the ink to about 15 percent by weight of the ink.

The radiation curable phase change inks can also optionally contain an antioxidant. The optional antioxidants can protect the images from oxidation and can also protect the ink components from oxidation during the heating portion of the ink preparation process. Specific examples of suitable antioxidant stabilizers include, for example, NAUGARD® 524, NAUGARD® 635, NAUGARD® A, NAUGARD® L-403, and NAUGARD® 959, commercially available from Crompton Corporation, Middlebury, Conn.; IRGANOX® 1010 and IRGASTAB® UV 10, commercially available from Ciba Specialty Chemicals; GENORAD 16 and GENORAD 40) commercially available from Rahn AG, Zurich, Switzerland, and the like, as well as mixtures thereof. When present, the optional antioxidant is present in the ink in any desired or effective amount, for example in one embodiment at least about 0.01 percent by weight of the ink carrier, in another embodiment at least about 0.1 percent by weight of the ink carrier, and in yet another embodiment at least about 1 percent by weight of the ink carrier, and in one embodiment no more than about 20 percent by weight of the ink carrier, in another embodiment no more than about 5 percent by weight of the ink carrier, and in yet another embodiment no more than about 3 percent by weight of the ink carrier.

The phase change inks may also contain a colorant. Any desired or effective colorant can be employed, including pigment, dye, mixtures of pigment and dye, mixtures of pigments, mixtures of dyes, and the like, provided that the colorant can be dissolved or dispersed in the ink vehicle. Examples of suitable dyes include, for example, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H$_8$B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (Ciba); Direct Brilliant Pink B (Global Colors); Aizen Spilon Red C-BH (Hodogaya Chemical), Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue SGMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

Pigments are also suitable colorants for the phase change inks. Examples of suitable pigments include PALIOGEN Violet S100 (BASF); PALIOGEN Violet 5890 (BASF); HELIOGEN Green L8730 (BASF); LITHOL, Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL, Scarlet 4440 (BASF); Bon Red C (Domimion Color Company): ORACET Pink RF (Ciba); PALIOGEN Red 3871 K (BASF); SUINFAST® Blue 15:3 (Sun Chemical); PALIOGEN Red 3340 (BASF); SUNTAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Ciariant); TRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF), NOVOPERM Yellow FGI, (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASLA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

In another specific embodiment, the colorant is a curable olefin colorant such as those disclosed in U.S. Pat. No. 6,870,063, U.S. Pat. No. 6,870,062, U.S. Pat. No. 6,787,658, and U.S. Patent Publication 20040142995, the disclosures of each of which are totally incorporated herein by reference.

The colorant is present in the phase change ink in any desired or effective amount to obtain the desired color or hue, for example in one embodiment at least about 0.1 percent by weight of the ink, and in another embodiment at least about 0.2 percent by weight of the ink, and in one embodiment no more than about 35 percent by weight of the ink, and in another embodiment less than 20 percent by weight of the ink and in another embodiment no more than about 8 percent by weight of the ink.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can include, for example, four component dyes, namely, cyan, magenta, yellow and black. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

The radiation curable phase change inks can also, if desired, contain additives to take advantage of the known functionality associated with such additives. Such additives may include, for example, defoamers, slip and leveling agents, pigment dispersants, and the like, as well as mixtures thereof. The inks can also include additional monomeric or polymeric materials as desired.

The ink compositions generally have melt viscosities from about 1 to 35 centipoise, in one embodiment from about 2 to about 30 centipoise, in another embodiment from about 5 centipoise to about 20 centipoise, and in yet another embodiment of from about 7 centipoise to about 15 centipoise.

The ink compositions generally have a jetting temperature from about 40° C. to 125° C., in one embodiment from about 50° C. to about 125° C., in another embodiment from about 60° C. to about 120° C., and in yet another embodiment from about 70° C. to about 110° C.

In embodiments, the method of forming an image includes melting the ink composition comprising an ink vehicle that includes at least one radiation curable carrier, at least one gellant, at least one radiation curable wax and at least one photoinitiator, jetting the radiation curable phase change ink onto an image receiving substrate, wherein the radiation curable phase change ink forms a gel state and exposing the radiation curable phase change ink on the image receiving substrate to ultraviolet light to cure the curable components of the radiation curable phase change ink.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C. At such low jetting temperatures, the conventional use of temperature differential between the jetted ink and the substrate upon which the ink is jetted to effect a rapid phase change in the ink (that is, from liquid to solid) may not be effective. The gellant can thus be used to affect a rapid viscosity increase in the jetted ink upon the substrate. In particular, jetted ink droplets can be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state).

In some embodiments, the temperature at which the ink forms the gel state is any temperature below the jetting temperature of the ink, in one embodiment any temperature that is about 5° C. or more below the jetting temperature of the ink. In one embodiment, the gel state can be formed at a temperature of at least about 25° C., and in another embodiment at a temperature of at least about 30° C., and in one embodiment of no more than about 100° C., in another embodiment of no more than about 70° C., and in yet another embodiment of no more than about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{2.5}$-fold increase in viscosity.

The ink compositions can be prepared by any desired or suitable method. For example, the ink ingredients can be mixed together, followed by heating, to a temperature in one embodiment of from about 80° C. to about 120° C., and stirring until a homogeneous ink composition is obtained, followed by cooling the ink to ambient temperature, for example from about 20 to about 25° C. The inks are solid at ambient temperature.

The inks can be employed in apparatus for direct printing ink jet processes. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL, LASERPRINT® paper, and the like, glossy coated papers such as XEROX® Digital Color Gloss, Sappi Warren Papers LUSTROGLOSS®, and the like, PASADENA LITHO LABEL® paper, transparency materials, fabrics, textile products, plastics, polymeric films, inorganic substrates such as metals, ceramics, and wood, and the like.

The subject matter disclosed herein will now be further illustrated by way of the following examples. All parts and percentages are by weight unless otherwise indicated.

Example 1

Sixteen inks were prepared. In each, the gellant comprised a mixture of:

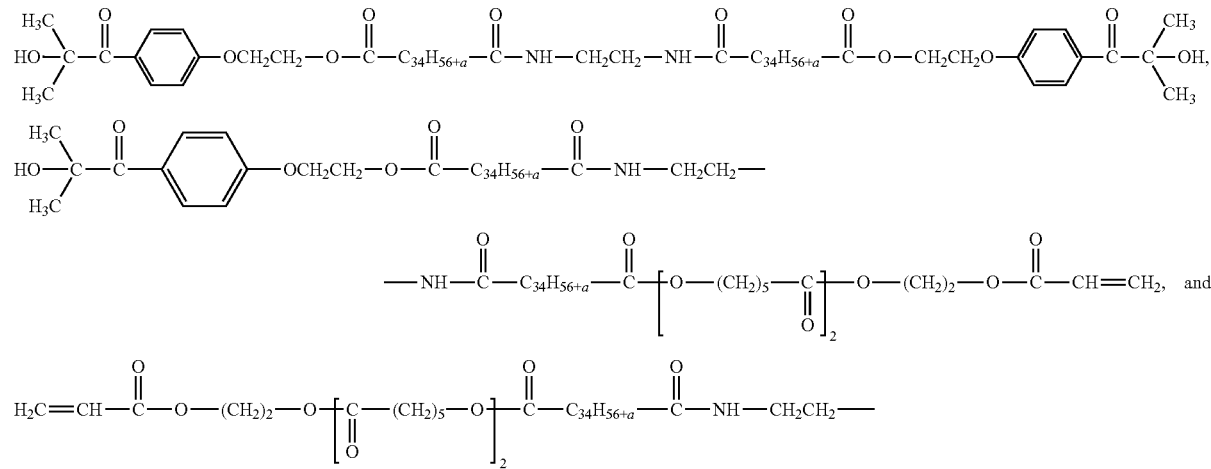

-continued

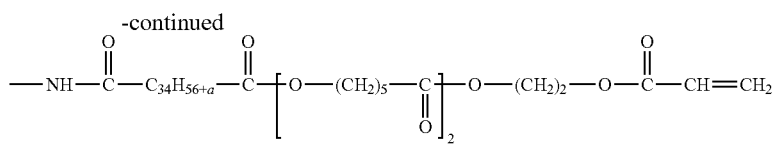

wherein —C$_{34}$H$_{56+a}$— represents a branched alkylene group which may include unsaturations and cyclic groups, wherein a is an integer of 0, 1, 2, 3, 4, 5, 6, 7, 8, 9, 10, 11, or 12 and wherein mixtures of the first:second:third compounds above are in a molar ratio of about 1:2:1. The UNILIN 350-acrylate wax (optionally prefiltered to 2 μm) was the curable wax. The ink carrier was SR9003, a propoxylated neopentyl glycol diacrylate, reactive monomer. The initiators were Irgacure 379, Darocur ITX and Irgacure 819. The stabilizer was Irgastab UV10. Tables 1 and 2 show the amount of each component in each ink. The inks were prepared by mixing the carrier, the wax and the gellant at 90° C. for 2 h, after which time the solutions were filtered to 0.22 μm at 85° C. The solutions were allowed to freeze overnight and then were refiltered to 0.22 μm at 85° C. To these solutions were added the photoinitiator package and stabilizer and the resulting ink base was stirred at 90° C. for 1 h. The ink bases were filtered to 0.22 μm at 85° C. The resulting solutions were added to a stirring solution of pigment dispersion, also at 90° C., and the resulting ink was stirred for 2 h at 90° C. All inks were filtered to 6 μm at 85° C.

TABLE 1

| Component | Ink, wt % | | | | | | | | | |
|---|---|---|---|---|---|---|---|---|---|---|
| | 1 | 2 | 3 | 4 | 5 | 6 | 7 | 8 | 9 | 10 |
| SR9003 | 70.8 | 69.8 | 68.3 | 65.8 | 63.3 | 60.8 | 55.8 | 50.8 | 45.8 | 40.8 |
| Gellant | 7.5 | 7.5 | 7.5 | 7.5 | 7.5 | 7.5 | 7.5 | 7.5 | 7.5 | 7.5 |
| UNILIN 350-acrylate prefiltered to 2 μm | 0 | 1 | 2.5 | 5 | 7.5 | 10 | 15 | 20 | 25 | 30 |
| IRGACURE 379 | 3 | 3 | 3 | 3 | 3 | 3 | 3 | 3 | 3 | 3 |
| DAROCUR ITX | 2 | 2 | 2 | 2 | 2 | 2 | 2 | 2 | 2 | 2 |
| IRGACURE 819 | 1 | 1 | 1 | 1 | 1 | 1 | 1 | 1 | 1 | 1 |
| IRGACURE 127 | 3.5 | 3.5 | 3.5 | 3.5 | 3.5 | 3.5 | 3.5 | 3.5 | 3.5 | 3.5 |
| IRGASTAB UV10 | 0.2 | 0.2 | 0.2 | 0.2 | 0.2 | 0.2 | 0.2 | 0.2 | 0.2 | 0.2 |
| Sun blue pigment dispersion, 25 wt % | 12 | 12 | 12 | 12 | 12 | 12 | 12 | 12 | 12 | 12 |

TABLE 2

| Component | Ink, wt % | | | | | |
|---|---|---|---|---|---|---|
| | 11 | 12 | 13 | 14 | 15 | 16 |
| SR9003 | 63.8 | 58.8 | 68.5 | 63.5 | 71.5 | 66.5 |
| Gellant | 7.5 | 7.5 | 7.5 | 7.5 | 7.5 | 7.5 |
| UNILIN 350-acrylate prefiltered to 2 μm | 0 | 5 | 0 | 5 | 0 | 5 |
| IRGACURE 379 | 3 | 3 | 3 | 3 | 3 | 3 |
| DAROCUR ITX | 2 | 2 | 2 | 2 | 2 | 2 |
| IRGACURE 819 | 1 | 1 | 1 | 1 | 1 | 1 |
| IRGACURE 127 | 3.5 | 3.5 | 3.5 | 3.5 | 3.5 | 3.5 |
| IRGASTAB UV10 | 0.2 | 0.2 | 0.2 | 0.2 | 0.2 | 0.2 |
| Sun yellow pigment dispersion, 16 wt % | 19 | 19 | | | | |
| Sun magenta pigment dispersion, 21 wt % | | | 14.3 | 14.3 | | |
| Sun black pigment dispersion, 26.5 wt % | | | | | 11.3 | 11.3 |

Figure 2:
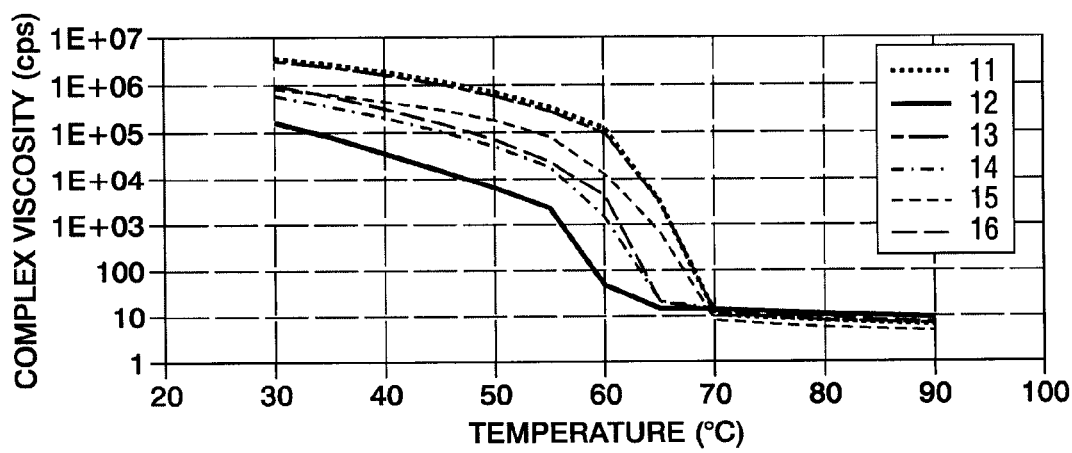
FIG. 2 depicts the rieological profiles of six ink compositions.

FIG. 1 provides the rheological profiles for inks 1-10. FIG. 2 provides the rheological profiles for inks 11-16. According to the rheological profiles, all of these inks are jettable (that is, have a viscosity of about 10 cps) at or below 90° C. The rheological characteristics of the inks were obtained by testing with a Rheometrics Fluid Spectrometer RFS3. A temperature sweep from 90° C. to 30° C. at 1 Hz sweep rate was conducted with measurements every five or ten degrees.

The inks were printed between 80 and 85° C. on a PHASER® 860 printer (modified to change the intermediate transfer drum temperature, paper preheating temperature, and ink heating temperature) directly onto paper attached to an intermediate transfer member at 30° C. and then exposed to UV light from a UV Fusion LC-6B Benchtop Conveyor equipped with CV Fusion Light Hammer 6 Ultraviolet Lamp System employing a "D" bulb for a minimum of 5 seconds. After curing the prints could neither be scratched nor smudged. The inks were printed on XEROX® DIGITAL COLOR GLOSS and Pasadena Litho Label coated papers.

Haloing Results

When the images on the Xerox Digital Color Gloss (XDCG) were observed under a microscope, there appeared to be no evidence of haloing with inks 2 and 4. Ink 1, however, exhibited haloing. Additionally, many drops appeared to be sitting on top of the paper when using ink 4.

When the images on the Pasadena Litho Label (PLL) paper were observed under a microscope, there also appeared to be no evidence of haloing and many of the drops appeared to be sitting on top of the paper when using ink 4.

Gloss Measurement Results

Gloss was measured with a BYK Gardner micro-TR1-gloss meter Catalog number 4520 using 60 degree gloss mode. Gloss was measured by the meter on a 100% fill patch and is expressed as unitless Gardner Gloss Units (GGU).

TABLE 3

| | Gloss at 60° (ggu), Ink # | | | | | |
|---|---|---|---|---|---|---|
| | 1 | | 2 | | 4 | |
| Position | Image | Paper | Image | Paper | Image | Paper |
| Left | 41.6 | 30.6 | 56.8 | 31.8 | 54.7 | 33.8 |
| Centre | 48.3 | 32.9 | 53.5 | 32.3 | 57.3 | 32.6 |
| Right | 42.3 | 30.8 | 58.8 | 30.8 | 59.9 | 33.6 |
| Average | 44.1 | 31.4 | 56.4 | 31.6 | 57.3 | 33.3 |

All of the inks produce glossy prints on Xerox Digital Color Gloss paper. The UNILIN 350-acrylate added to inks 2 and 4 does not inhibit gloss.

Syneresis Study

Inks 1, 2, 4, 6, 8 and 10 were monitored for evidence of liquid separating from the bulk gel (syneresis) on a weekly basis. The results are shown in Table 4.

TABLE 4

| | | Observed syneresis over time at room temperature (RT) | | | | | | |
|---|---|---|---|---|---|---|---|---|
| | wt % UNILIN | Evidence of separation at RT, weeks | | | | | | |
| Ink | 350-acrylate | 4 | 5 | 6 | 7 | 8 | 9 | 10 |
| 1 | 0 | N | Y | Y | Y | Y | Y | Y |
| 2 | 1 | N | N | Y | Y | Y | Y | Y |
| 4 | 5 | N | N | slight | Y | Y | Y | Y |
| 6 | 10 | N | N | N | N | N | N | N |
| 8 | 20 | N | N | N | N | N | N | N |
| 10 | 30 | N | N | N | N | N | N | N |

Ink 1, without UNILIN 350-acrylate wax, shows evidence of syneresis (<0.1 wt %) after 5 weeks at room temperature (RT). By adding 1-5 wt % of UNILIN 350-acrylate wax, onset of syneresis was delayed by 1 week. With ≧10 wt % UINILN 350-acrylate wax, no syneresis was observed after 10 weeks at RT.

Showthrough Measurements on Plain Paper

Differential showthrough and optical density measurements were made with an X-Rite 938 spectrodensitometer. Differential showthrough values quoted represent the difference between underside showthrough and one-paper overside showthough. Each measurement was made in triplicate. The error bars in the figures represent the 95% confidence interval.

Figure 3:
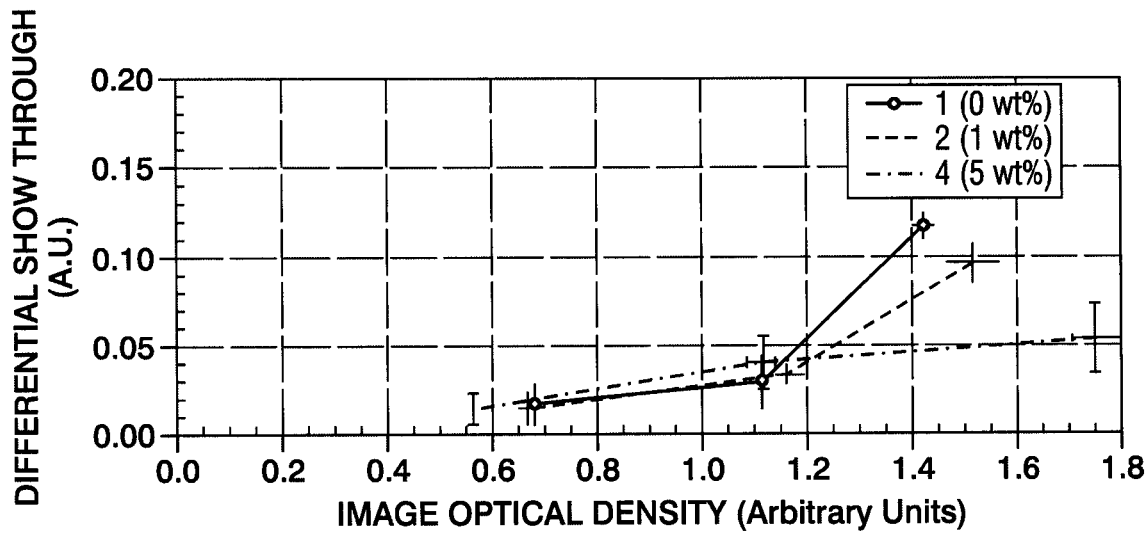
FIG. 3 depicts the differential showthrough as a function of image optical density of three compositions on XEROX® 4024 paper.
Figure 4:
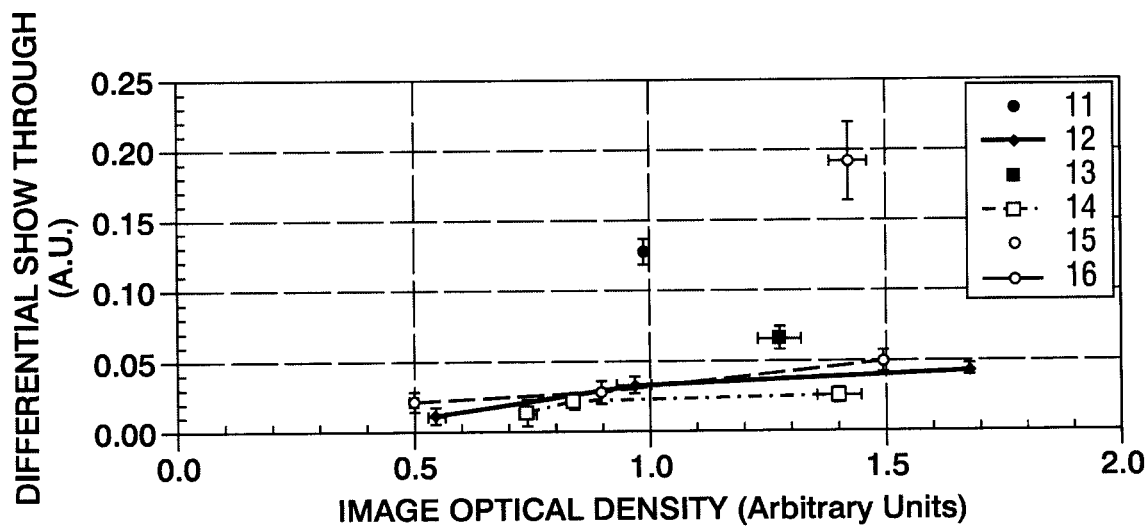
FIG. 4 depicts the differential showthrough as a function of image optical density of six compositions on XEROX® 4024 paper.

FIG. 3 provides the differential showthrough of inks 1, 2 and 4 as a function of image optical density (O.D.) on XEROX® 4024 paper. FIG. 4 provides the differential showthrough of inks 11-16 as a function of image optical density (O.D.) on XEROX® 4024 paper.

Figure 5:
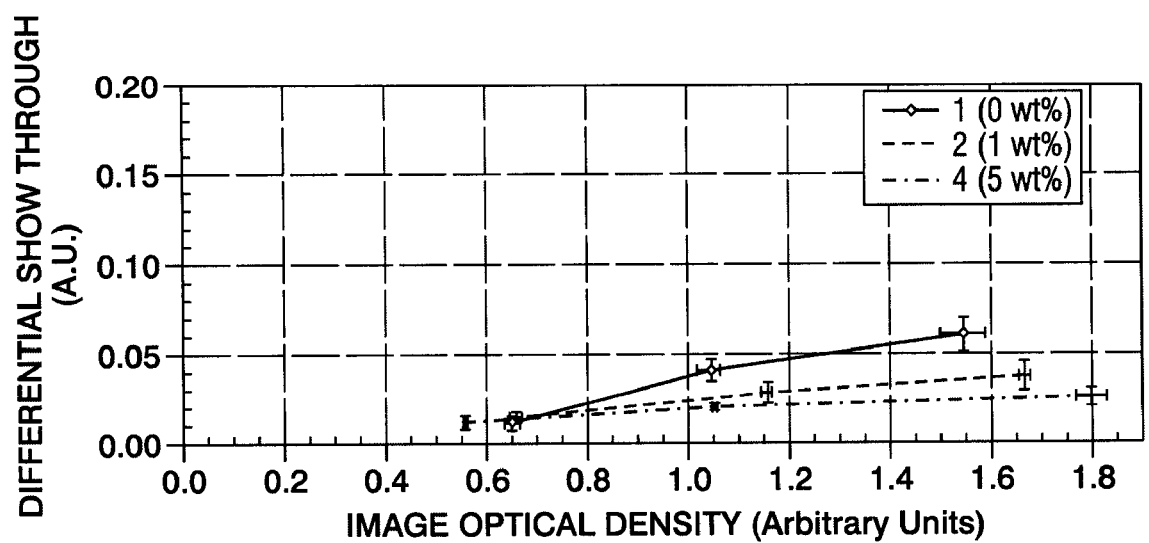
FIG. 5 depicts the differential showthrough as a function of image optical density of three compositions on HANMER-MILL® paper.

FIG. 5 provides the differential showthrough of the inks as a function of image optical density (O.D.) on HAMMERMILL® paper.

As O.D. increases, the addition of 1.0 to 5.0 wt. % curable wax decreases the amount of differential showthrough observed.

Gloss Measurements

TABLE 5

| | Gloss measurements on XEROX ® 4024 | | | | | |
|---|---|---|---|---|---|---|
| | Gloss at 60° (ggu), Ink # | | | | | |
| | 1 | | 2 | | 4 | |
| Position | Image | Paper | Image | Paper | Image | Paper |
| Left | 5.6 | 4.5 | 6.6 | 4.7 | 6.6 | 4.8 |
| Centre | 5.4 | 4.7 | 6.3 | 4.5 | 6.3 | 4.7 |
| Right | 5.8 | 4.3 | 6.3 | 4.4 | 6.8 | 4.5 |
| Average | 5.6 | 4.5 | 6.4 | 4.5 | 6.6 | 4.7 |

TABLE 6

| | Gloss measurements on HAMMERMILL ® | | | | | |
|---|---|---|---|---|---|---|
| | Gloss at 60° (ggu), Ink # | | | | | |
| | 1 | | 2 | | 4 | |
| Position | Image | Paper | Image | Paper | Image | Paper |
| Left | 8.9 | 5.1 | 7.9 | 4.7 | 7.6 | 4.9 |
| Centre | 8.8 | 5.0 | 8.3 | 5.0 | 7.4 | 4.8 |
| Right | 8.8 | 4.9 | 8.1 | 4.6 | 7.8 | 5.0 |
| Average | 8.8 | 5.0 | 8.1 | 4.8 | 7.6 | 4.9 |

Even with the addition of UNILIN 350-acrylate wax, prints from inks 2 and 4, exhibit gloss on XEROX® 4024 and HAMMERMILL® papers.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A radiation curable phase change ink comprising an ink vehicle that includes at least one radiation curable carrier, at least one gellant, at least one radiation curable wax and at least one photoinitiator,
wherein the at least one radiation curable wax is a polyethylene wax functionalized with a curable group selected from the group consisting of acrylate, methacrylate, alkene, allylic ether, epoxide and oxetane, wherein the at least one radiation curable wax has a melting point from about 70° C. to about 100° C., and
wherein the at least one gellant of the ink vehicle is of the formula

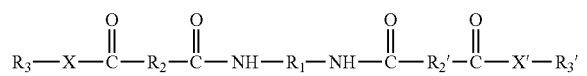

wherein $R_1$ is an ethylene group;
wherein $R_2$ and $R_2'$ each, independently of the other, are groups of the formula $-C_{34}H_{56+a}-$, wherein a is an integer of 0-12;
wherein $R_3$ and $R_3'$ each, independently of the other, are either (a) photoinitiating groups, or (b) groups which are (i) alkyl groups, comprising linear or branched, saturated or unsaturated, cyclic or acyclic, or substituted or unsubstituted alkyl groups, and wherein heteroatoms either may or may not be present in the alkyl group, (ii) aryl groups, comprising substituted or unsubstituted aryl groups, wherein heteroatoms either may or may not be present in the aryl group, (iii) arylalkyl groups, comprising substituted or unsubstituted arylalkyl groups, wherein the alkyl portion of the arylalkyl group can be linear or branched, saturated or unsaturated, or cyclic or acyclic, and wherein heteroatoms either may or may not be present in either the aryl or the alkyl portion of the arylalkyl group, or (iv) alkylaryl groups, comprising substituted or unsubstituted alkylaryl groups, wherein the alkyl portion of the alkylaryl group can be linear or branched, saturated or unsaturated, or cyclic or acyclic and wherein heteroatoms either may or may not be present in either the aryl or the alkyl portion of the alkylaryl group, and X and X' each, independently of the other, is an oxygen atom or a group of the formula $-NR_4-$, wherein $R_4$ is (i) a hydrogen atom, (ii) an alkyl group, comprising linear or branched, saturated or unsaturated, cyclic or acyclic, and substituted or unsubstituted alkyl groups, and wherein heteroatoms either may or may not be present in the alkyl group, (iii) an aryl group, comprising substituted or unsubstituted aryl groups, and wherein heteroatoms either may or may not be present in the aryl group, (iv) an arylalkyl group, comprising substituted or unsubstituted arylalkyl groups, wherein the alkyl portion of the arylalkyl group can be linear or branched, saturated or unsaturated, or cyclic or acyclic, or wherein heteroatoms either may or may not be present in either the aryl or the alkyl portion of the arylalkyl group, or (v) an alkylaryl group, comprising substituted and unsubstituted alkylaryl groups, wherein the alkyl portion of the alkylaryl group can be linear or branched, saturated or unsaturated, or cyclic or acyclic, and wherein heteroatoms either may or may not be present in either the aryl or the alkyl portion of the alkylaryl group.

2. The radiation curable phase change ink according to claim 1, wherein the at least one radiation curable carrier is selected from the group consisting of an acrylate, a methacrylate, an alkene, a vinyl ether, an allylic ether, an epoxide, an oxetane and mixtures thereof.

3. The radiation curable phase change ink according to claim 1, wherein the at least one radiation curable carrier comprises a propoxylated neopentyl glycol diacrylate.

4. The radiation curable phase change ink according to claim 1, wherein the at least one gellant is one or more of:

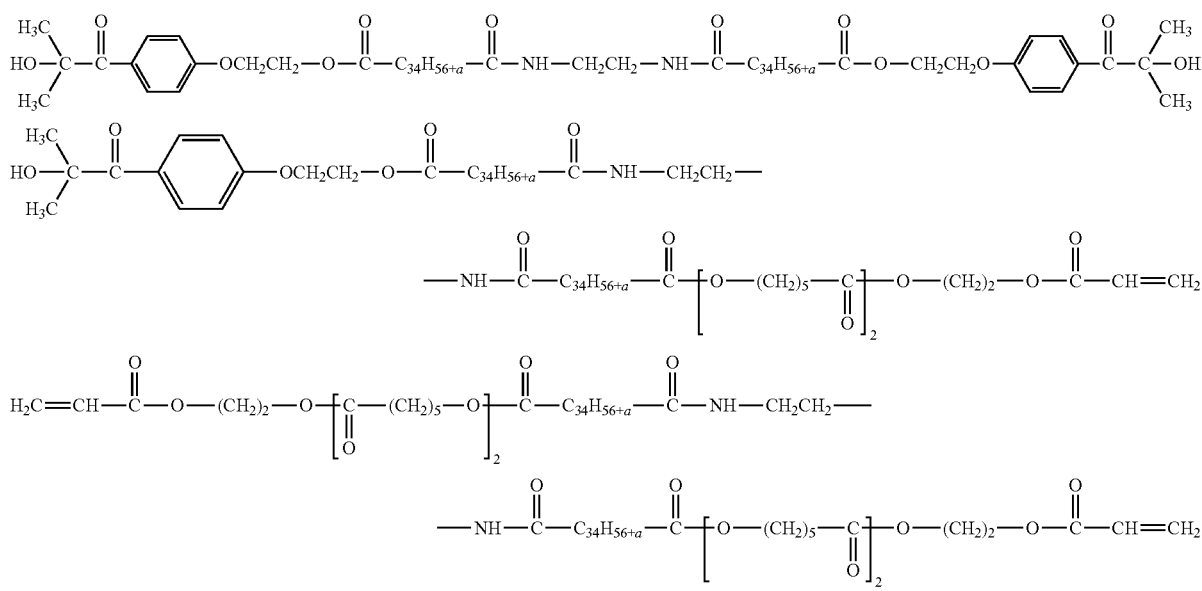

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12.

5. The radiation curable phase change ink according to claim 1, wherein the curable group is an acrylate group.

6. The radiation curable phase change ink according to claim 1, further comprising a colorant.

7. The radiation curable phase change ink according to claim 1, wherein the at least one photoinitiator is a photoinitiator selected from the group consisting of benzophenones, benzyl ketones, monomeric hydroxyl ketones, polymeric hydroxyl ketones, α-amino ketones, acyl phosphine oxides, metallocenes, benzoin ethers, benzil ketals, α-hydroxyalkylphenones, α-aminoalkylphenones, acylphosphine, arylsulphonium salts, aryl iodonium salts and mixtures thereof.

8. The radiation curable phase change ink according to claim 1, wherein the at least one radiation curable wax comprises from about 1 to about 30 wt. % of the ink.

9. The radiation curable phase change ink according to claim 1, wherein the polyethylene wax is a hydroxyl-terminated polyethylene wax or a carboxylic acid-terminated polyethylene wax.

10. The radiation curable phase change ink according to claim 1, wherein the polyethylene wax functionalized with a curable group has an average molecular weight of at least 375 g/mol.

11. The method of forming an image, comprising
melting a radiation curable phase change ink comprising an ink vehicle that includes at least one radiation curable carrier, at least one gellant, at least one radiation curable wax and at least one photoinitiator;
jetting the radiation curable phase change ink onto an image receiving substrate, wherein the radiation curable phase change ink forms a gel state;
exposing the radiation curable phase change ink on the image receiving substrate to ultraviolet light to cure the curable components of the radiation curable phase change ink;
wherein the at least one radiation curable wax is a polyethylene wax functionalized with a curable group selected from the group consisting of acrylate, methacrylate, alkene, allylic ether, epoxide and oxetane, wherein the at least one radiation curable wax has a melting point from about 70° C. to about 100° C., and
wherein the at least one gellant of the ink vehicle is of the formula

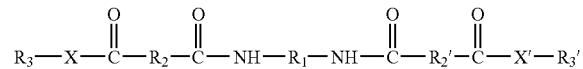

wherein $R_1$ is an ethylene group;
wherein $R_2$ and $R_2'$ each, independently of the other, are groups of the formula —$C_{34}H_{56+a}$—, wherein a is an integer of 0-12;
wherein $R_3$ and $R_3'$ each, independently of the other, are either (a) photoinitiating groups, or (b) groups which are (i) alkyl groups, comprising linear or branched, saturated or unsaturated, cyclic or acyclic, or substituted or unsubstituted alkyl groups, and wherein heteroatoms either may or may not be present in the alkyl group, (ii) aryl groups, comprising substituted or unsubstituted aryl groups, wherein heteroatoms either may or may not be present in the aryl group, (iii) arylalkyl groups, comprising substituted or unsubstituted arylalkyl groups, wherein the alkyl portion of the arylalkyl group can be linear or branched, saturated or unsaturated, or cyclic or acyclic, and wherein heteroatoms her may or may not be present in either the aryl or the alkyl portion of the arylalkyl group, or (iv) alkylaryl groups, comprising substituted or unsubstituted alkylaryl groups, wherein the alkyl portion of the alkylaryl group can be linear or branched, saturated or unsaturated, or cyclic or acyclic and
wherein heteroatoms either may or may not be present in either the aryl or the alkyl portion of the alkylaryl group, and X and X' each, independently of the other, is an oxygen atom or a group of the formula —$NR_4$—, wherein $R_4$ is (i) a hydrogen atom, (ii) an alkyl group, comprising linear or branched, saturated or unsaturated, cyclic or acyclic, and substituted or unsubstituted alkyl groups, and wherein heteroatoms either may or may not be present in the alkyl group, (iii) an aryl group, comprising substituted or unsubstituted aryl groups, and wherein heteroatoms either may or may not be present in the aryl group, (iv) an arylalkyl group, comprising substituted or unsubstituted arylalkyl groups, wherein the alkyl portion of the arylalkyl group can be linear or branched, saturated or unsaturated, or cyclic or acyclic, or wherein heteroatoms either may or may not be present in either the aryl or the alkyl portion of the arylalkyl group, or (v) an alkylaryl group, comprising substituted and unsubstituted alkylaryl groups, wherein the alkyl portion of the alkylaryl group can be linear or branched, saturated or unsaturated, or cyclic or acyclic, and wherein heteroatoms either may or may not be present in either the aryl or the alkyl portion of the alkylaryl group.

12. The method of forming an image according to claim 11, wherein the image optical density of the ink is less than 1.2.

13. The method of forming an image according to claim 11, wherein the jetting temperature is from about 60° C. to about 110° C.

14. The method of forming an image according to claim 11, wherein the exposing the radiation curable phase change ink on the image receiving substrate to ultraviolet light is for an amount of time from about 0.01 to about 5 seconds.

15. A radiation curable phase change ink comprising an ink vehicle that comprises at least one radiation curable carrier present in an amount from about 0.1% to about 98% by weight of the ink, at least one gellant present in an amount from about 1% to about 25% by weight of the ink, at least one radiation curable wax present in an amount from about 0.1% to about 50% by weight of the ink and at least one photoinitiator present in an amount from about 0.5% to about 15% by weight of the ink,
wherein the at least one radiation curable wax is a polyethylene wax functionalized with a curable group selected from the group consisting of acrylate, methacrylate, alkene, allylic ether, epoxide and oxetane, wherein the at least one radiation curable wax has a melting point from about 70° C. to about 100° C., and
wherein the at least one gellant of the ink vehicle is of the formula

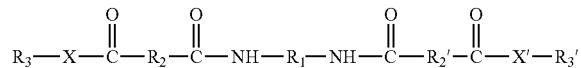

wherein $R_1$ is an ethylene group;
wherein $R_2$ and $R_2'$ each, independently of the other, are groups of the formula —$C_{34}H_{56+a}$—, wherein a is an integer of 0-12;

wherein $R_3$ and $R_3'$ each, independently of the other, are either (a) photoinitiating groups, or (b) groups which are (i) alkyl groups, comprising linear or branched, saturated or unsaturated, cyclic or acyclic, or substituted or unsubstituted alkyl groups, and wherein heteroatoms either may or may not be present in the alkyl group, (ii) aryl groups, comprising substituted or unsubstituted aryl groups, wherein heteroatoms either may or may not be present in the aryl group, (iii) arylalkyl groups, comprising substituted or unsubstituted arylalkyl groups, wherein the alkyl portion of the arylalkyl group can be linear or branched, saturated or unsaturated, or cyclic or acyclic, and wherein heteroatoms either may or may not be present in either the aryl or the alkyl portion of the arylalkyl group, or (iv) alkylaryl groups, comprising substituted or unsubstituted alkylaryl groups, wherein the alkyl portion of the alkylaryl group can be linear or branched, saturated or unsaturated, or cyclic or acyclic and wherein heteroatoms either may or may not be present in either the aryl or the alkyl portion of the alkylaryl group, and X and X' each, independently of the other, is an oxygen atom or a group of the formula —$NR_4$—, wherein $R_4$ is (i) a hydrogen atom, (ii) an alkyl group, comprising linear or branched, saturated or unsaturated, cyclic or acyclic, and substituted or unsubstituted alkyl groups, and wherein heteroatoms either may or may not be present in the alkyl group, (iii) an aryl group, comprising substituted or unsubstituted aryl groups, and wherein heteroatoms either may or may not be present in the aryl group, (iv) an arylalkyl group, comprising substituted or unsubstituted arylalkyl groups, wherein the alkyl portion of the arylalkyl group can be linear or branched, saturated or unsaturated, or cyclic or acyclic, or wherein heteroatoms either may or may not be present in either the aryl or the alkyl portion of the arylalkyl group, or (v) an alkylaryl group, comprising substituted and unsubstituted alkylaryl groups, wherein the alkyl portion of the alkylaryl group can be linear or branched, saturated or unsaturated, or cyclic or acyclic, and wherein heteroatoms either may or may not be present in either the aryl or the alkyl portion of the alkylaryl group.

16. The radiation curable phase change ink according to claim 15, wherein the at least one radiation curable carrier comprises a propoxylated neopentyl glycol diacrylate.

17. The radiation curable phase change ink according to claim 15, wherein the curable group is an acrylate group.

18. The radiation curable phase change ink according to claim 15, further comprising a colorant.

* * * * *